US012362981B2

(12) United States Patent
Peruga et al.

(10) Patent No.: US 12,362,981 B2
(45) Date of Patent: Jul. 15, 2025

(54) APPARATUS AND METHOD FOR COMPENSATING PHASE NOISE

(71) Applicant: NOKIA TECHNOLOGIES OY, Espoo (FI)

(72) Inventors: Ismael Peruga, Tampere (FI); Toni Levanen, Tampere (FI); Mikko Valkama, Nokia (FI); Markku Renfors, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/254,723

(22) PCT Filed: Nov. 19, 2021

(86) PCT No.: PCT/FI2021/050790
§ 371 (c)(1),
(2) Date: May 26, 2023

(87) PCT Pub. No.: WO2022/112648
PCT Pub. Date: Jun. 2, 2022

(65) Prior Publication Data
US 2024/0372770 A1     Nov. 7, 2024

(30) Foreign Application Priority Data

Nov. 27, 2020 (FI) .................................... 20206211

(51) Int. Cl.
*H04L 27/26* (2006.01)
*H04L 5/00* (2006.01)
(52) U.S. Cl.
CPC ........ *H04L 27/2691* (2013.01); *H04L 5/0048* (2013.01); *H04L 27/2675* (2013.01)

(58) Field of Classification Search
CPC ............... H04L 27/2691; H04L 5/0048; H04L 27/2675
See application file for complete search history.

(56) References Cited

U.S. PATENT DOCUMENTS 9,160,382 B2   10/2015   Wu et al.
9,258,107 B1   2/2016   Warke et al.
(Continued)

OTHER PUBLICATIONS

"3rd Generation Partnership Project; Technical Specification Group Radio Access Network; NR; NR and NG-RAN Overall Description; Stage 2 (Release 16)", 3GPP TS 38.300 v16.2.0, (Jul. 2020), 148 pages.

(Continued)

*Primary Examiner* — Janice N Tieu
(74) *Attorney, Agent, or Firm* — ALSTON & BIRD LLP

(57) ABSTRACT

Disclosed is a method for compensating phase noise. A symbol comprising one or more data sub-symbols and one or more pilot sub-symbols is received (501). A sequence of first phase noise estimates is obtained (502) based at least partly on the one or more pilot sub-symbols. A first filter is used to obtain (503, 507) a first sequence of filtered phase noise estimates from at least a subset of the one or more data sub-symbols based at least partly on the sequence of first phase noise estimates. The first sequence of filtered phase noise estimates is stored (506, 510). Phase noise compensation is applied (512) to the one or more data sub-symbols based at least partly on the first sequence of filtered phase noise estimates.

20 Claims, 16 Drawing Sheets

(56) References Cited

U.S. PATENT DOCUMENTS

| | | | |
|---|---|---|---|
| 10,003,480 B2 | 6/2018 | Soriaga et al. | |
| 2015/0098535 A1* | 4/2015 | Wu | H04B 1/1027 |
| | | | 375/350 |
| 2018/0091350 A1 | 3/2018 | Akkarakaran et al. | |
| 2018/0198667 A1 | 7/2018 | He | |
| 2019/0132247 A1 | 5/2019 | Zhang et al. | |
| 2020/0116774 A1 | 4/2020 | Mansour | |
| 2021/0409103 A1* | 12/2021 | Tarighat Mehrabani | |
| | | | H04B 7/15521 |

OTHER PUBLICATIONS

"3rd Generation Partnership Project; Technical Specification Group Radio Access Network; NR; Physical channels and modulation (Release 16)", 3GPP TS 38.211 v16.2.0, (Jun. 2020), 131 pages.

"3rd Generation Partnership Project; Technical Specification Group Radio Access Network; Study on new radio access technology: Radio Frequency (RF) and co-existence aspects (Release 14)", 3GPP TR 38.803 v14.2.0, (Sep. 2017), 205 pages.

"3rd Generation Partnership Project; Technical Specification Group Radio Access Network; Study on requirements for NR beyond 52.6 GHz (Release 16)", 3GPP TR 38.807 v16.0.0, (Dec. 2019), 68 pages.

Anbar et al., "Iterative SC-FDMA Frequency Domain Equalization and Phase Noise Mitigation," 2018 International Symposium on Intelligent Signal Processing and Communication Systems (ISPACS), (Dec. 13-14, 2018), pp. 91-95.

Gomaa et al., "Blind phase noise compensation for SC-FDMA with application to LTE-uplink," 2012 IEEE International Conference on Communications (ICC), (Jun. 10-15, 2012), pp. 4305-4309.

Intel Corporation, "Revised SID on Study on NR beyond 52.6GHz", 3GPP TSG RAN Meeting #81, RP-182066, (Sep. 10-13, 2018), 4 pages.

Intel Corporation, "Study on NR design for above 52.6 GHz", 3GPP TSG RAN Meeting #79, RP-180320, (Mar. 19-22, 2018), 4 pages.

International Search Report and Written Opinion for Patent Cooperation Treaty Application No. PCT/FI2021/050790 dated Feb. 2, 2022, 15 pages.

Kamiya et al., "Pilot-Symbol-Assisted Phase Noise Compensation With Forward-Backward Wiener Smoothing Filters", IEEE Transactions on Signal Processing, vol. 65, No. 17, (Sep. 1, 2017), 11 pages.

Levanen et al., "Mobile Communications Beyond 52.6 GHz: Waveforms, Numerology, and Phase Noise Challenge", arXiv:1912.09072v2, (May 8, 2020), 8 pages.

Office Action for Finland U.S. Appl. No. 20/206,211 dated Jul. 29, 2021, 9 pages.

Qualcomm, "New SID on NR waveform beyond 52.6GHz", 3GPOP TSG RAN Meeting #79, RP-180453, (Mar. 19-22, 2019), 4 pages.

Syrjälä et al., "Methods For Phase Noise Mitigation For DFT-S-OFDM Waveforms", 2016 IEEE Global Conference on Signal and Information Processing (GlobalSIP), (Apr. 24, 2017), 5 pages.

Zou et al., "A Phase Noise Compensation Scheme For OFDM Wireless Systems", 14th European Signal Processing Conference (EUSIPCO 2006), (Sep. 4-8, 2006), 5 pages.

* cited by examiner

APPARATUS AND METHOD FOR COMPENSATING PHASE NOISE

CROSS-REFERENCE TO RELATED APPLICATIONS

This application is a national phase entry of International Application No. PCT/FI2021/050790, filed Nov. 19, 2021, which claims priority to Finnish Application No. 20206211, filed Nov. 27, 2020, the contents of which are hereby incorporated by reference in their entirety.

FIELD

The following exemplary embodiments relate to wireless communication.

BACKGROUND

In wireless communication, phase noise from a transmitter and receiver radio frequency local oscillator may degrade a wireless signal. It is desirable to mitigate the impact of phase noise.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: receive a symbol comprising one or more data sub-symbols and one or more pilot sub-symbols; obtain a sequence of first phase noise estimates based at least partly on the one or more pilot sub-symbols; use a first filter to recursively obtain a first sequence of filtered phase noise estimates from at least a subset of the one or more data sub-symbols based at least partly on the sequence of first phase noise estimates; store the first sequence of filtered phase noise estimates; and apply phase noise compensation to the one or more data sub-symbols based at least partly on the first sequence of filtered phase noise estimates.

According to another aspect, there is provided an apparatus comprising means for: receiving a symbol comprising one or more data sub-symbols and one or more pilot sub-symbols; obtaining a sequence of first phase noise estimates based at least partly on the one or more pilot sub-symbols; using a first filter to recursively obtain a first sequence of filtered phase noise estimates from at least a subset of the one or more data sub-symbols based at least partly on the sequence of first phase noise estimates; storing the first sequence of filtered phase noise estimates; and applying phase noise compensation to the one or more data sub-symbols based at least partly on the first sequence of filtered phase noise estimates.

According to another aspect, there is provided a system comprising at least a first apparatus and a second apparatus. For example, the first apparatus may be a base station or a terminal device, and the second apparatus may be a terminal device or a base station. The first apparatus is configured to transmit, to the second apparatus, a symbol comprising one or more data sub-symbols and one or more pilot sub-symbols. The second apparatus is configured to: receive, from the first apparatus, the symbol comprising the one or more data sub-symbols and the one or more pilot sub-symbols, wherein the received one or more data sub-symbols and one or more pilot-symbols are corrupted by phase noise; obtain a sequence of first phase noise estimates based at least partly on the one or more pilot sub-symbols; use a first filter to recursively obtain a first sequence of filtered phase noise estimates from at least a subset of the one or more data sub-symbols based at least partly on the sequence of first phase noise estimates; store the first sequence of filtered phase noise estimates; and apply phase noise compensation to the one or more data sub-symbols based at least partly on the first sequence of filtered phase noise estimates.

According to another aspect, there is provided a system comprising at least a first apparatus and a second apparatus. For example, the first apparatus may be a base station or a terminal device, and the second apparatus may be a terminal device or a base station. The first apparatus comprises means for transmitting, to the second apparatus, a symbol comprising one or more data sub-symbols and one or more pilot sub-symbols. The second apparatus comprises means for: receiving, from the first apparatus, the symbol comprising the one or more data sub-symbols and the one or more pilot sub-symbols, wherein the received one or more data sub-symbols and one or more pilot-symbols are corrupted by phase noise; obtaining a sequence of first phase noise estimates based at least partly on the one or more pilot sub-symbols; using a first filter to recursively obtain a first sequence of filtered phase noise estimates from at least a subset of the one or more data sub-symbols based at least partly on the sequence of first phase noise estimates; storing the first sequence of filtered phase noise estimates; and applying phase noise compensation to the one or more data sub-symbols based at least partly on the first sequence of filtered phase noise estimates.

According to another aspect, there is provided a method comprising receiving a symbol comprising one or more data sub-symbols and one or more pilot sub-symbols; obtaining a sequence of first phase noise estimates based at least partly on the one or more pilot sub-symbols; using a first filter to recursively obtain a first sequence of filtered phase noise estimates from at least a subset of the one or more data sub-symbols based at least partly on the sequence of first phase noise estimates; storing the first sequence of filtered phase noise estimates; and applying phase noise compensation to the one or more data sub-symbols based at least partly on the first sequence of filtered phase noise estimates.

According to another aspect, there is provided a computer program comprising instructions for causing an apparatus to perform at least the following: receive a symbol comprising one or more data sub-symbols and one or more pilot sub-symbols; obtain a sequence of first phase noise estimates based at least partly on the one or more pilot sub-symbols; use a first filter to recursively obtain a first sequence of filtered phase noise estimates from at least a subset of the one or more data sub-symbols based at least partly on the sequence of first phase noise estimates; store the first sequence of filtered phase noise estimates; and apply phase noise compensation to the one or more data sub-symbols based at least partly on the first sequence of filtered phase noise estimates.

According to another aspect, there is provided a computer readable medium comprising program instructions for causing an apparatus to perform at least the following: receive a symbol comprising one or more data sub-symbols and one or more pilot sub-symbols; obtain a sequence of first phase noise estimates based at least partly on the one or more pilot sub-symbols; use a first filter to recursively obtain a first sequence of filtered phase noise estimates from at least a subset of the one or more data sub-symbols based at least partly on the sequence of first phase noise estimates; store the first sequence of filtered phase noise estimates; and apply phase noise compensation to the one or more data sub-symbols based at least partly on the first sequence of filtered phase noise estimates.

According to another aspect, there is provided a non-transitory computer readable medium comprising program instructions for causing an apparatus to perform at least the following: receive a symbol comprising one or more data sub-symbols and one or more pilot sub-symbols; obtain a sequence of first phase noise estimates based at least partly on the one or more pilot sub-symbols; use a first filter to recursively obtain a first sequence of filtered phase noise estimates from at least a subset of the one or more data sub-symbols based at least partly on the sequence of first phase noise estimates; store the first sequence of filtered phase noise estimates; and apply phase noise compensation to the one or more data sub-symbols based at least partly on the first sequence of filtered phase noise estimates.

BRIEF DESCRIPTION OF THE DRAWINGS

In the following, various exemplary embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
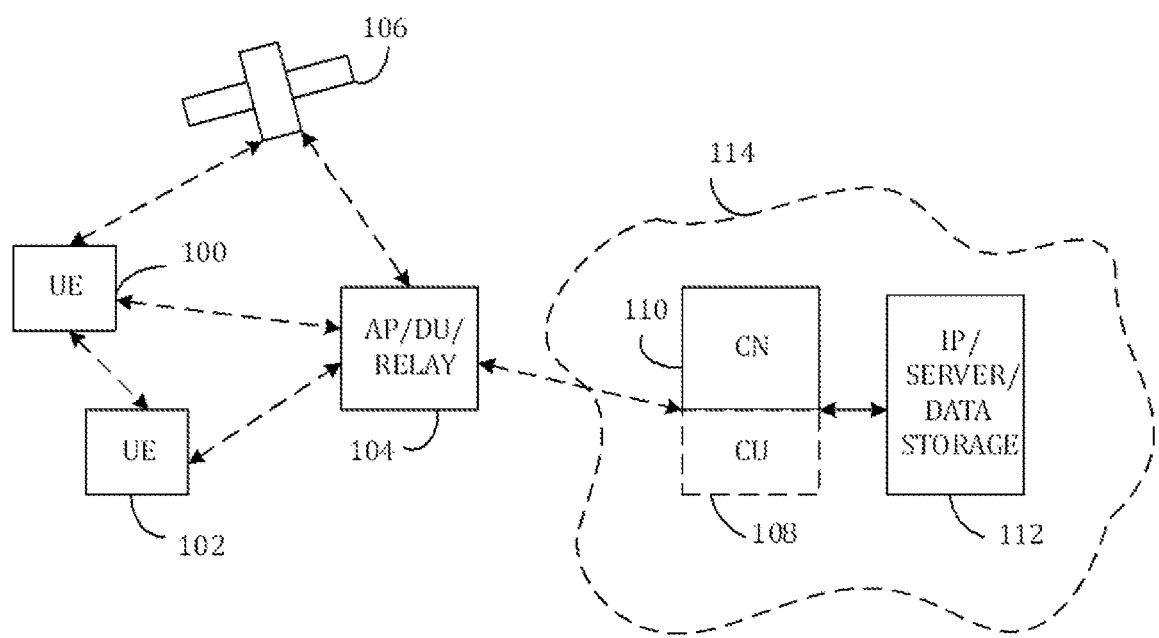
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB may be called uplink or reverse link and the physical link from the (e/g)NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g)NodeB may be a computing device configured to control the radio resources of communication system it is coupled to. The NodeB may also be referred to as a base station, an access point or any other type of interfacing device including a relay station capable of operating in a wireless environment. The (e/g) NodeB may include or be coupled to transceivers. From the transceivers of the (e/g)NodeB, a connection may be provided to an antenna unit that establishes bi-directional radio links to user devices. The antenna unit may comprise a plurality of antennas or antenna elements. The (e/g)NodeB may further be connected to core network 110 (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station.

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G may enable using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz—cmWave, below 6 GHz—cmWave—mmWave). One of the concepts considered to be used in 5G networks may be network slicing in which multiple independent and dedicated virtual sub-networks (network instances) may be created within the same infrastructure to run services that have different requirements on latency, reliability, throughput and mobility.

The current architecture in LTE networks may be fully distributed in the radio and fully centralized in the core network. The low latency applications and services in 5G may require to bring the content close to the radio which leads to local break out and multi-access edge computing (MEC). 5G may enable analytics and knowledge generation to occur at the source of the data. This approach may require leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It may also be possible that node operations will be distributed among a plurality of servers, nodes or hosts. Application of cloudRAN architecture may enable RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano) satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g)NodeBs or may be a Home(e/g)nodeB. Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In multilayer networks, one access node may provide one kind of a cell or cells, and thus a plurality of (e/g)NodeBs may be required to provide such a network structure.

For fulfilling the need for improving the deployment and performance of communication systems, the concept of "plug-and-play" (e/g)NodeBs may be introduced. A network which may be able to use "plug-and-play" (e/g) Node Bs, may include, in addition to Home (e/g)NodeBs (H(e/g) nodeBs), a home node B gateway, or HNB-GW (not shown in FIG. 1). A HNB Gateway (HNB-GW), which may be installed within an operator's network, may aggregate traffic from a large number of HNBs back to a core network.

Carrier frequencies above 52.6 GHz comprise large spectrum allocations, and they may support many high capacity use cases. These frequencies may share some characteristics with respect to lower frequency bands, such as high propagation loss, low power amplifier efficiency, high phase noise, and strict transmitted power spectral density regulatory requirements. For NR systems operating at frequencies above 24.25 GHz, one requirement may be robustness to frequency offset and phase noise. Systems operating above 24.25 GHz may suffer from higher phase noise, which may limit the use of high order modulations, and therefore decrease the spectrum efficiency of the system.

Higher sub-carrier spacing, SCS, may be used to reduce the phase noise effect. However, increasing the SCS may impact the system, since the bandwidth and symbol rate are increased. Therefore, faster processing may be needed. In addition, the time duration of the cyclic prefix, CP, decreases when the SCS is larger and the CP overhead is maintained. The reduced CP may lead to radio link performance degradation due to inter-symbol interference induced by the frequency selective channel. With shorter symbol durations, the scheduling periods may become too short and control channel coverage may be degraded. In addition, reduced CP length may cause problems with beam switching, as the switch time may become longer than the CP duration. Apart from this, also higher power spectral densities, PSD, for transmitted signals with an equal number of subcarriers are provided with smaller SCS, and the required sampling rate is smaller, thus reducing the power consumption.

With discrete Fourier transform spread orthogonal frequency division multiplexing, DFT-s-OFDM, which may also be referred to as single carrier frequency division multiple access, SC-FDMA, time-domain phase tracking reference signals, PTRS, may be utilized to track the phase noise over time within the DFT-s-OFDM symbol and correct the received samples. There may be five configurations available with different numbers of PTRS blocks per DFT-s-OFDM symbol (2, 4 or 8) and samples per PTRS block (2 or 4). These configurations are depicted in Table 1 below. $M_{sc}^{PUSCH}$ denotes scheduled bandwidth for uplink transmission, expressed as a number of subcarriers.

TABLE 1

| Number of PTRS groups | Number of samples per PTRS group | Index m of PTRS samples in OFDM symbol l prior to transform precoding |
|---|---|---|
| 2 | 2 | $s \lfloor M_{sc}^{PUSCH}/4 \rfloor + k - 1$ where $s = 1, 3$ and $k = 0, 1$ |
| 2 | 4 | $sM_{sc}^{PUSCH} + k$ where $\begin{cases} s = 0 & \text{and } k = 0, 1, 2, 3 \\ s = 1 & \text{and } k = -4, -3, -2, -1 \end{cases}$ |
| 4 | 2 | $\lfloor s M_{sc}^{PUSCH}/8 \rfloor + k - 1$ where $s = 1, 3, 5, 7$ and $k = 0, 1$ |
| 4 | 4 | $sM_{sc}^{PUSCH}/4 + n + k$ where $\begin{cases} s = 0 & \text{and } k = 0, 1, 2, 3 & n = 0 \\ s = 1, 2 & \text{and } k = -2, -1, 0, 1 & n = \lfloor M_{sc}^{PUSCH}/8 \rfloor \\ s = 4 & \text{and } k = -4, -3, -2, -1 & n = 0 \end{cases}$ |
| 8 | 4 | $\lfloor sM_{sc}^{PUSCH}/8 \rfloor + n + k$ where $\begin{cases} s = 0 & \text{and } k = 0, 1, 2, 3 & n = 0 \\ s = 1, 2, 3, 4, 5, 6 & \text{and } k = -2, -1, 0, 1 & n = \lfloor M_{sc}^{PUSCH}/16 \rfloor \\ s = 8 & \text{and } k = -4, -3, -2, -1 & n = 0 \end{cases}$ |

For mmWave communications, the phase noise from the transmitter and receiver radio frequency, RF, local oscillator, LO, may degrade the signal quality. Phase noise may increase by approximately 6 dB as the carrier frequency doubles. Since DFT-s-OFDM is based on the use of several orthogonal subcarriers, the phase noise effects in the frequency domain may be divided into two components: common phase error, CPE, and inter-carrier interference, ICI. CPE may produce a rotation that is common to all the subcarriers, and it may be compensated by rotating all the subcarriers with the estimated CPE value. ICI may be caused by the loss of orthogonality between subcarriers due to the convolution between the phase noise frequency response and the data-bearing subcarriers. In the time domain, CPE may be observed as a common phase rotation over the time domain samples, and ICI may be seen as the time variation of the phase noise within the DFT-s-OFDM symbol.

A DFT-s-OFDM symbol may comprise one or more pilot sub-symbols and one or more data sub-symbols. Pilot sub-symbols may be used for estimating phase noise and for other channel estimation purposes. Pilot sub-symbols comprise known data, i.e. known modulation symbols, which may be used to detect changes, such as phase noise, in the channel. In other words, the pilot sub-symbols are known at the receiver, and thus the receiver may compare the pilot sub-symbols comprised in a received signal against the known original pilot sub-symbols.

Figure 2A:
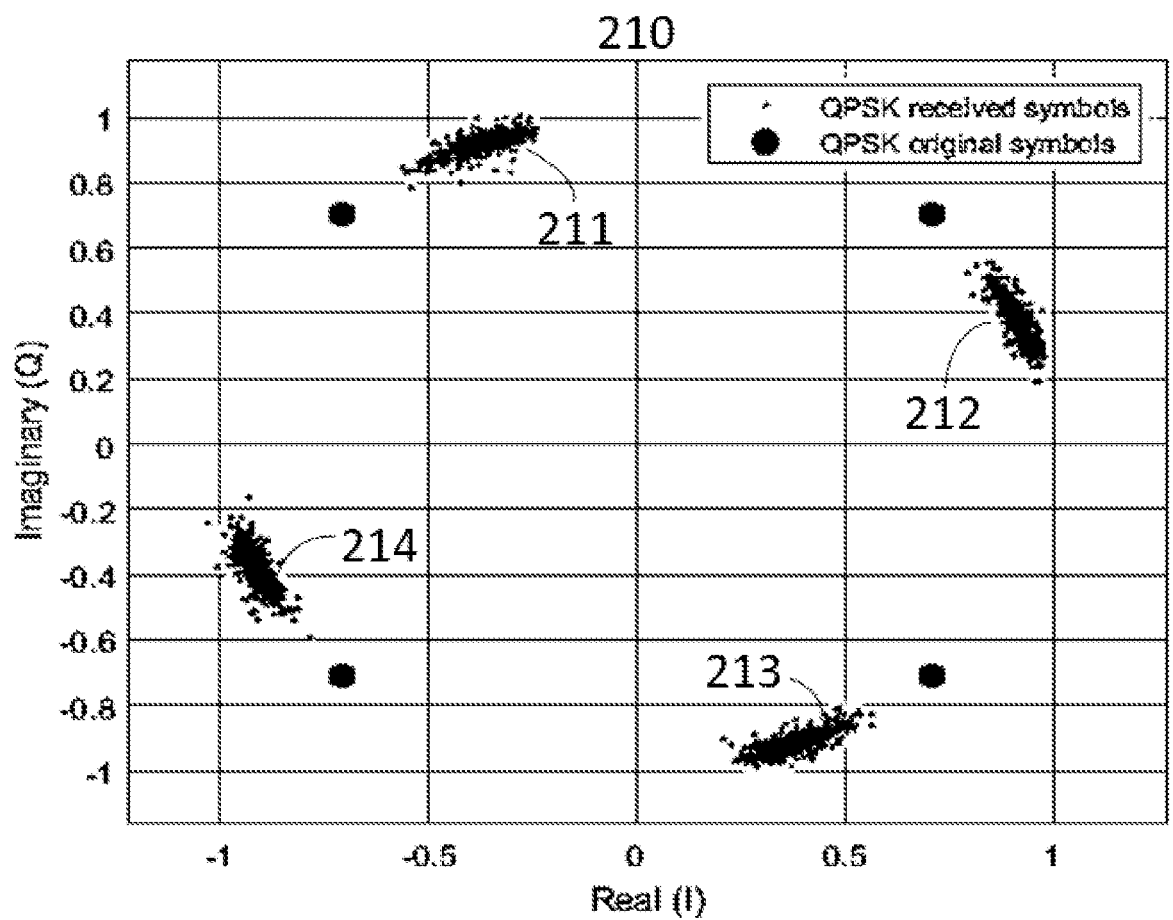
FIGS. 2a and 2b illustrate effects of phase noise on received constellation symbols.
Figure 2B:
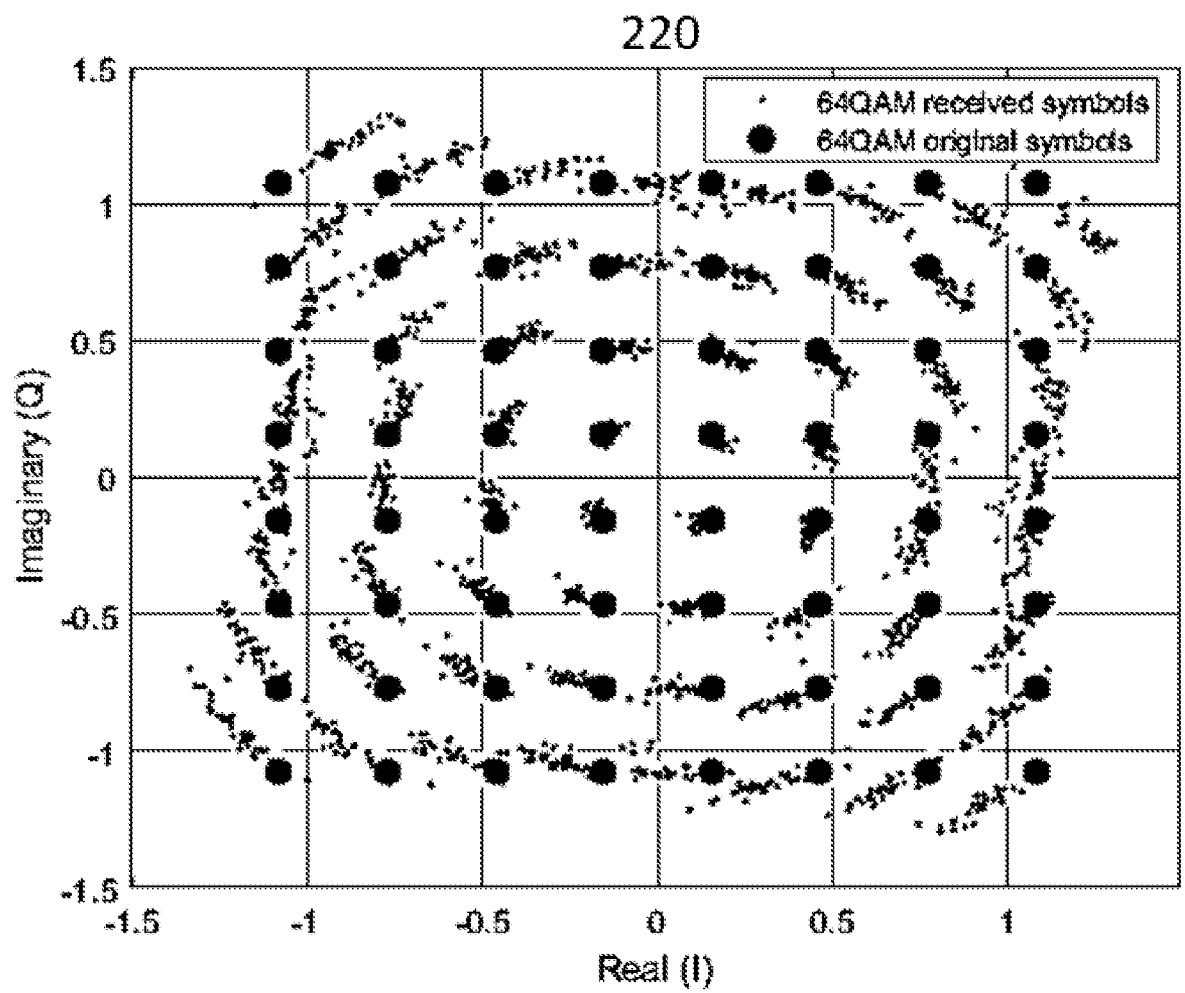

FIGS. 2a and 2b illustrate effects of phase noise on received constellation symbols. FIG. 2a illustrates an example 210 on the effect of phase noise on received constellation symbols for quadrature phase shift keying, QPSK, and FIG. 2b illustrates an example 220 on the effect of phase noise on received constellation symbols for 64 QAM (quadrature amplitude modulation). The smaller dots correspond to the time domain sub-symbols received within one DFT-s-OFDM symbol. Herein sub-symbols refer to the group of modulation symbols that are part of an DFT-s-OFDM symbol. From the QPSK example 210, the CPE error can be distinguished as common rotation, and ICI as the dispersion of samples around the mean value, corresponding to the dot cloud 211, 212, 213, 214 around its centre. When the modulation order increases, the phase noise effect may generate more errors in the detection. Therefore, higher order modulations may be more sensitive to phase noise degradation, and a technique for reducing the errors caused by phase noise may be needed.

Figure 3:
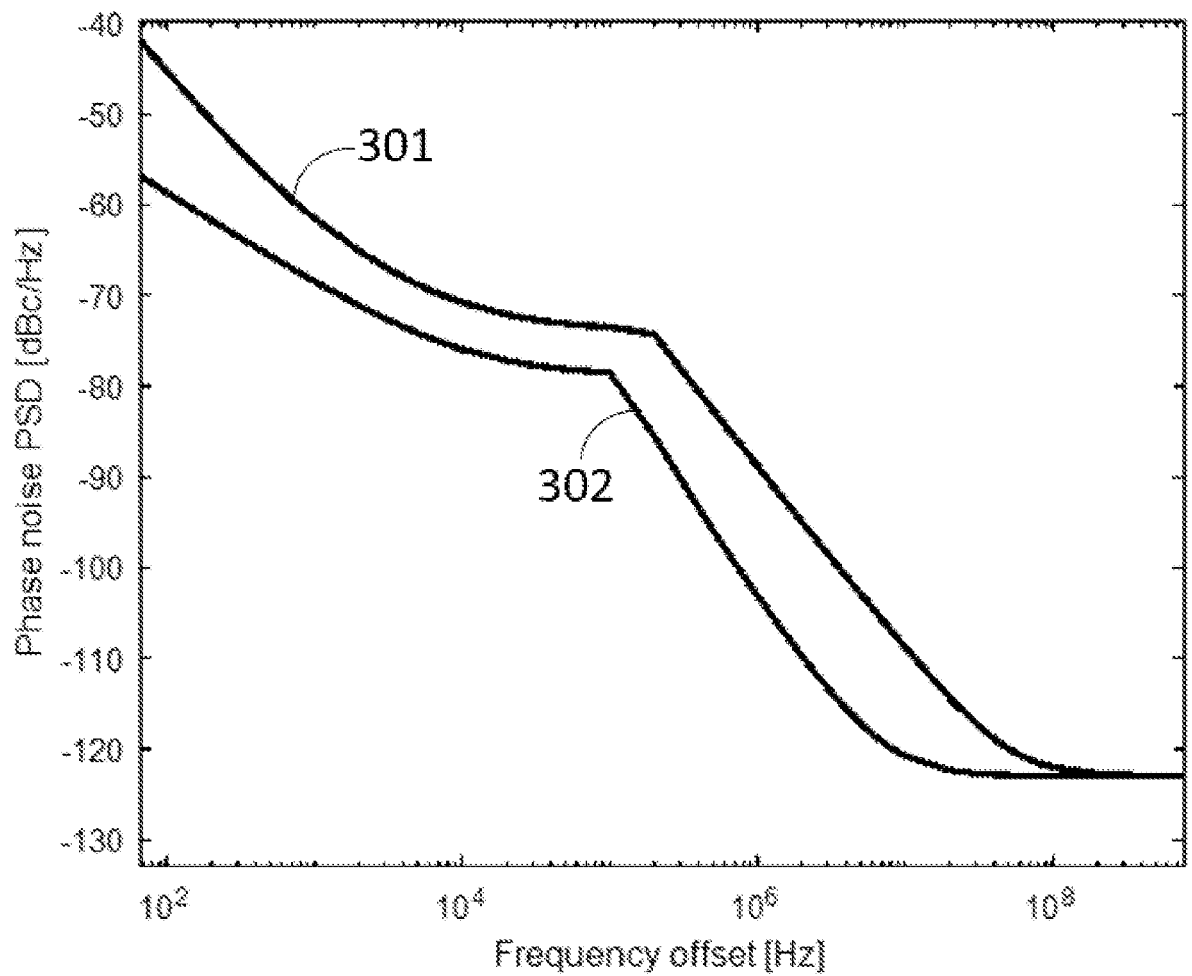
FIG. 3 illustrates power spectral density of phase noise models.

FIG. 3 illustrates power spectral density, PSD, of phase noise models at a 90 GHz carrier frequency designed to model UE and base station phase noise. The upper curve 301 represents the UE phase noise model, and the lower curve 302 represents the base station phase noise model.

By using time domain phase tracking signals, the time-varying response of the phase noise may be compensated within a DFT-s-OFDM symbol. However, using the maximum number of supported PTRSs per DFT-s-OFDM symbol, i.e. 8 groups and 4 samples per group, may not be enough to compensate the phase noise for higher order modulation, if a proper phase noise compensation algorithm is not used in communications beyond 24.25 GHz.

Figure 4:
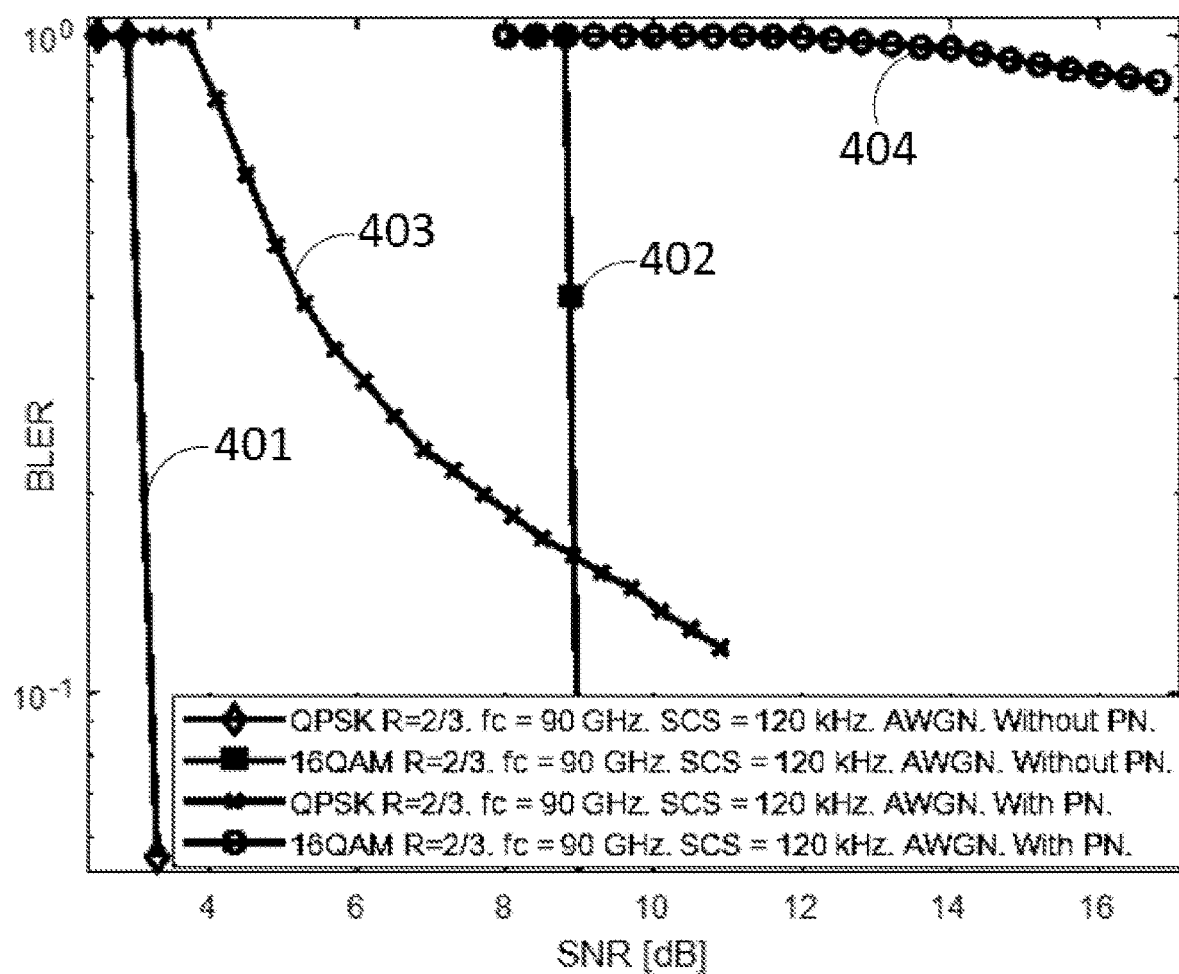
FIG. 4 illustrates simulated measurement results.

FIG. 4 illustrates simulated measurement results. FIG. 4 illustrates the performance of QPSK and 16 QAM AWGN (additive white Gaussian noise) channels with 120 kHz SCS in the presence of phase noise and without phase noise at a carrier frequency of 90 GHz with a coding rate of R=⅔. In FIG. 4, BLER denotes block error rate and SNR denotes signal-to-noise ratio. In the receiver processing, no phase noise compensation is used. The curve 401 illustrates QPSK without phase noise. The curve 402 illustrates 16 QAM without phase noise. The curve 403 illustrates QPSK with phase noise. The curve 404 illustrates 16 QAM with phase noise. It may be seen that when phase noise is present, the received signals suffer high degradation, and the performance is worse for both modulations. When the modulation order increases, the effect is even more significant. Therefore, techniques to compensate for the phase noise are needed.

Some exemplary embodiments may address the phase noise problem and reduce its impact. Some exemplary embodiments may compensate the high phase noise present for example in millimetre wave, mmWave, communications, and reduce the degradation effects that it produces, such as CPE, and/or ICI. Some exemplary embodiments may be based on DFT-s-OFDM waveform, but they may also be applied to any other single carrier waveform, or whenever time-domain phase noise tracking can be performed. Some exemplary embodiments may provide a phase noise compensation algorithm that improves the link performance for example under severe phase noise conditions.

Figure 5:
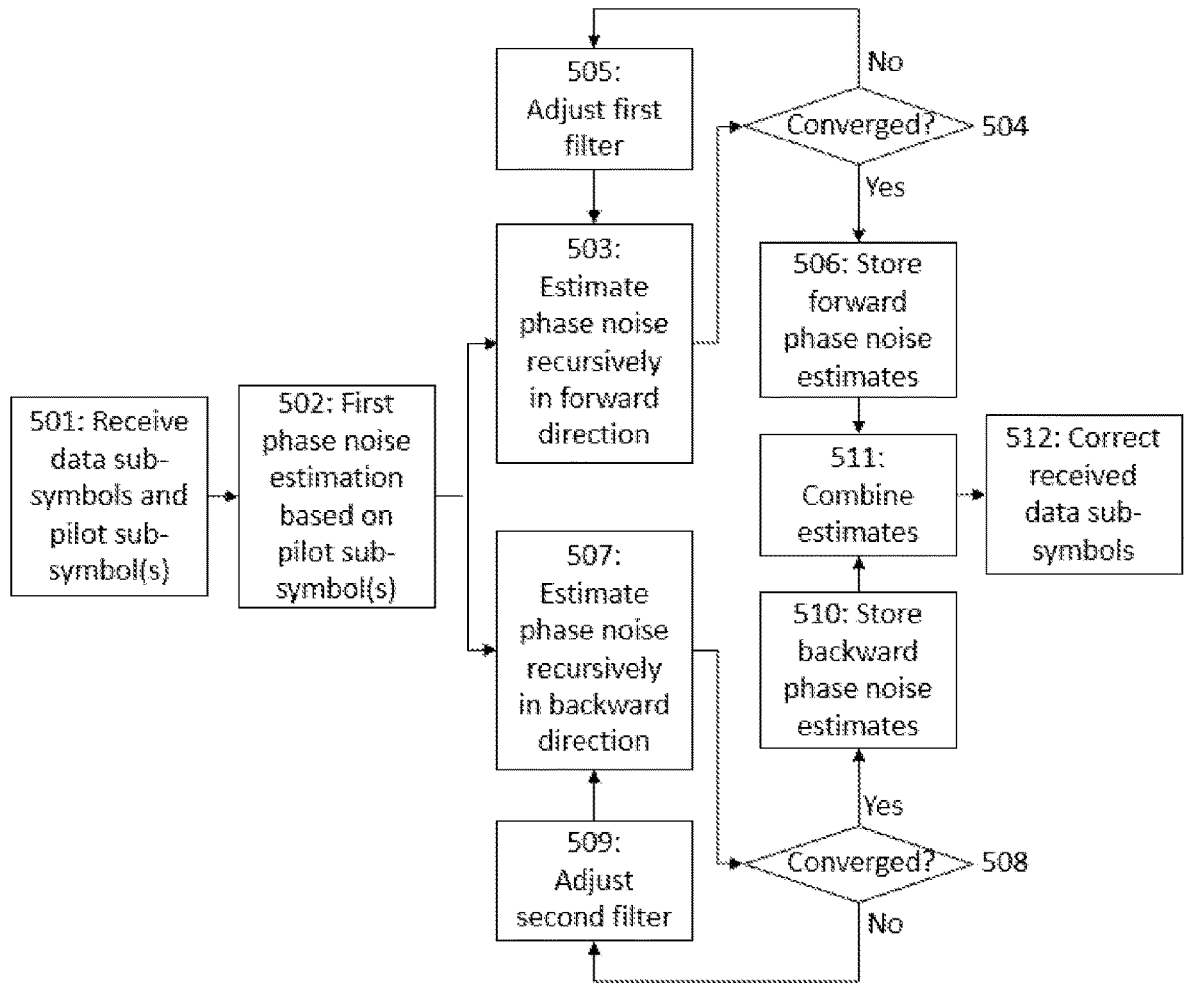
FIG. 5 illustrates a flow chart according to an exemplary embodiment.

FIG. 5 illustrates a flow chart according to an exemplary embodiment for a recursive phase noise compensation algorithm for time-domain phase noise tracking, which may improve the link performance for example under high phase noise conditions. The phase noise may be estimated recursively, for example sub-symbol by sub-symbol, in the time domain starting from a first estimate based on one or more pilot sub-symbols. The recursive estimation of the phase noise may be adjusted by means of a parameter $\lambda$, which defines the infinite impulse response, IIR, filter used on the recursive phase noise estimate. The parameter $\lambda$ may vary based on, for example, the available SNR, the modulation in use, and/or the code rate. Backward estimation may also be used in addition to forward estimation, and they may be combined in order to improve the quality and accuracy of the phase noise estimate.

Referring to FIG. 5, a sampled signal, r[k], comprising at least one DFT-s-OFDM symbol is received 501, wherein the at least one DFT-s-OFDM symbol comprises one or more data sub-symbols and one or more pilot sub-symbols that are used as input for the phase noise compensation algorithm. A phase noise estimation step parameter, $\lambda$, may also be received as input for the algorithm. A first phase noise estimation is performed 502 based on the one or more pilot sub-symbols or groups of pilot sub-symbols in order to obtain a sequence of first phase noise estimates, wherein there may be one first phase noise estimate for each group of pilot sub-symbols. In other words, the first phase noise estimation may be performed for all the pilot sub-symbol groups, p∈{1, 2, . . . , N}, comprised in the received signal. The first phase noise estimate for the pilot sub-symbols may be obtained, for example, as:

$$\Delta_\phi^p = \arg\left(\sum_{k=0}^{P-1} \frac{r_p[k]}{x_p[k]}\right)$$

where $\Delta_\phi^p$ is the average phase estimation over the pilot sub-symbol group p, P is the number of sub-symbols comprised in the pilot sub-symbol group p, $x_p[k]$ is the kth sub-symbol of the pilot sub-symbol group, and $r_p[k]$ is the kth received sample of the pilot sub-symbol group p. Arg(•) returns the phase.

The phase noise is estimated 503 recursively in the forward direction by using a first IIR filter, for example a first-order IIR filter, to obtain a first sequence of filtered phase noise estimates. In other words, the first sequence of filtered phase noise estimates may be obtained by recursively applying the corresponding first phase noise estimate to a data sub-symbol, making the hard decision, obtaining an unfiltered raw phase noise estimate for this data sub-symbol, and then applying the IIR filter to the raw phase noise estimate. This is then repeated for the next data sub-symbol. For example, the recursive phase noise estimation may be performed sub-symbol by sub-symbol for a block of data sub-symbols. Alternatively, in order to reduce computations, the recursive phase noise estimation may be performed for example by using every second or third sub-symbol in the block, and interpolating the effective phase noise for the skipped sub-symbols in between the every second or third sub-symbol. In other words, the first sequence of filtered phase noise estimates is obtained from at least a subset of the one or more data sub-symbols.

After performing the recursive phase noise estimation for one block of data sub-symbols, the convergence of the forward phase noise estimate may be checked 504. In the convergence check, one or more pilot sub-symbols in a group of pilot sub-symbols are compensated based on the forward phase noise estimate, and compared against the corresponding reference point value, i.e. the original known value of the one or more pilot sub-symbols. The convergence measure allows to check, in the receiver, if the estimated phase noise response corresponds to the received data with respect to the pilot sub-symbol groups. If the corrected pilot sub-symbol matches, or at least substantially matches, with the corresponding known reference point, it means that the algorithm has converged. If they do not match, the phase noise estimator has not converged to the correct point when reaching the neighbouring pilot sub-symbol group. This may be valuable information for the receiver, and may be used to scale sub-symbol detection probabilities or log-likelihood ratios, for example.

A likelihood value of the estimate may also be determined and stored in order to provide sample-wise scaling of the phase noise estimation step parameter $\lambda$. The likelihood value may be determined based on a distance, for example Euclidean distance or angular distance, between the corrected sample and the closest reference point. Based on the distance between the corrected sample and the closest reference point, the value of $\lambda$ may be modified each sample, for example by increasing the value when the distance of the phase noise compensated sub-symbol is small with regard to the hard decision, and reducing the value when the distance of the phase noise compensated sub-symbol is large with regard to the hard decision.

If the forward phase noise estimate has not converged (504: no), then the parameter $\lambda$ of the first IIR filter may be adjusted 505, for example increased or decreased. The forward estimation 503 may then be performed again for the same block of data sub-symbols with the adjusted value of $\lambda$. In addition to this, the phase noise estimation may be run for the same block of data sub-symbols with several values of $\lambda$, and the estimation with the value of $\lambda$ that corrects the following pilot sub-symbol most accurately is the phase noise estimation that is returned for that block of data sub-symbols. Alternatively, if convergence is not achieved with the used $\lambda$, the CPE within this pilot sub-symbol block interval may be used as the phase noise estimate.

If the forward phase noise estimate has converged (504: yes), then the forward phase noise estimate(s) are stored 506 in a buffer. The phase noise estimate(s) may be stored as real values, for example as an angle measured as degrees or radians, instead of complex values.

The phase noise may be estimated 507 recursively also in the backward direction by using a second IIR filter, for example a first-order IIR filter, to obtain a second sequence of filtered phase noise estimates from at least a subset of the one or more data sub-symbols based at least partly on the sequence of first phase noise estimates. In other words, the second sequence of filtered phase noise estimates is obtained in a reverse order compared to the first sequence of filtered phase noise estimates. Convergence of the backward phase noise estimate may be checked 508 and the likelihood of the estimate may be stored.

If the backward phase noise estimate has not converged (508: no), then the parameter $\lambda$ for the second IIR filter may be adjusted 509, for example increased or decreased. The backward estimation 507 may then be performed again for the same block of data symbols with the adjusted value of $\lambda$.

If the backward phase noise estimate has converged (508: yes), then the backward phase noise estimate(s) are stored 510. The phase noise estimate(s) may be stored as real values, for example as an angle measured as degrees or radians, instead of complex values.

After the forward and backward phase noise estimates have both converged, the forward and backward phase noise estimates, i.e. the first and second sequence of filtered phase noise estimates, are combined 511. The combination may be done in different ways, such as the average phase between the forward and backward estimate, or any other type of combination. The one or more data sub-symbols comprised in the received signal are corrected 512 in order to provide a compensated signal, $\tilde{r}$, with reduced phase noise distortion. The compensation may be done by multiplying the received samples with the conjugate of the combined phase noise estimate. For example, a phase rotator may be used to compensate the signal.

The functions and/or blocks described above by means of FIG. 5 are in no absolute chronological order, and some of them may be performed simultaneously or in an order differing from the described one. Other functions and/or blocks may also be executed between them or within them.

It should be noted that although the procedure illustrated in FIG. 5 can be performed iteratively, it is not mandatory to perform it iteratively. In other words, a single iteration may be sufficient. Latency may be reduced by performing a single iteration instead of multiple iterations.

Figure 6A:
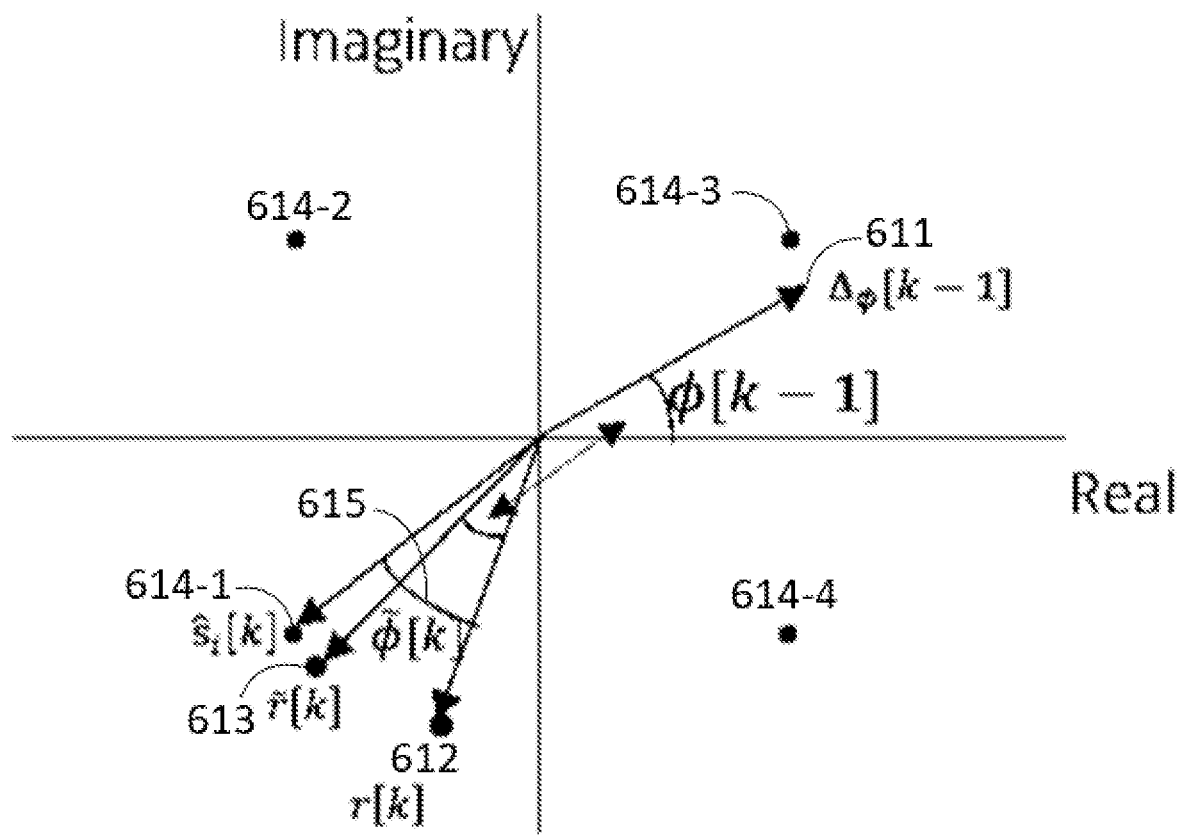
FIGS. 6a and 6b illustrate procedures for updating phase noise estimates according to an exemplary embodiment.
Figure 6B:
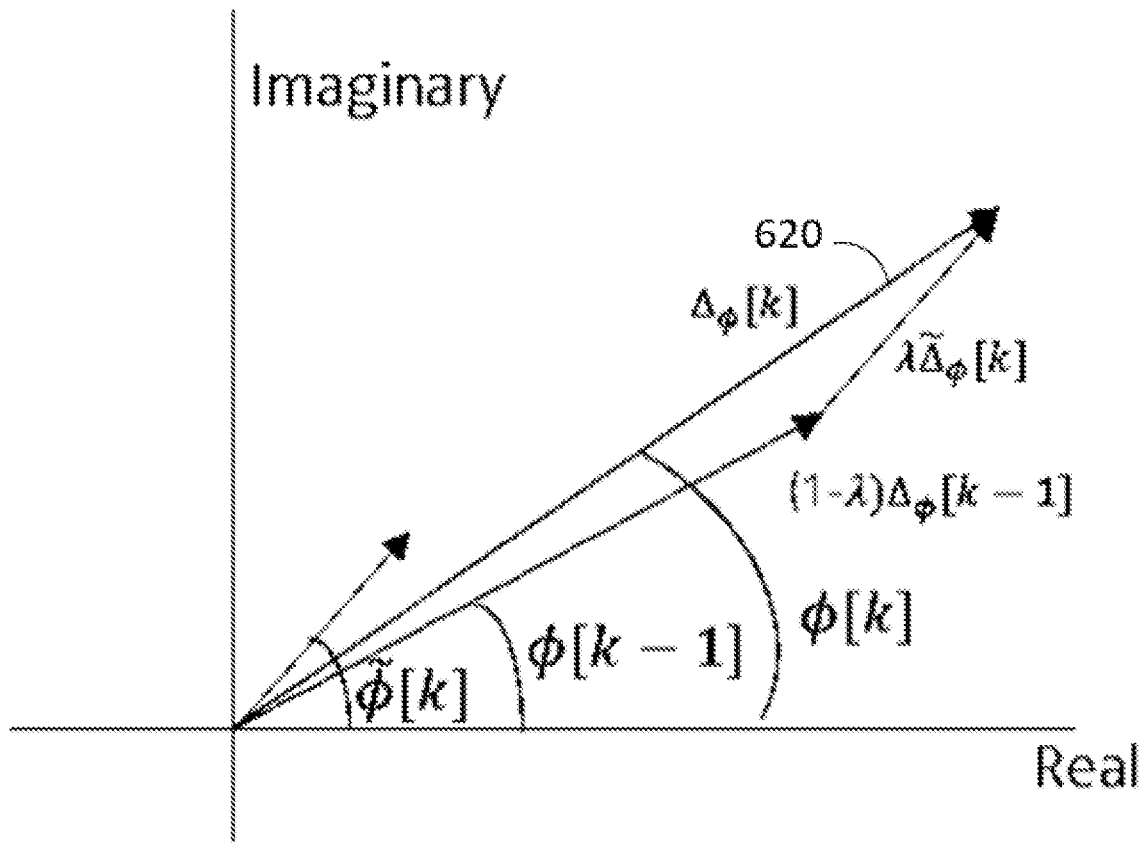

FIGS. 6a and 6b illustrate the procedures for updating the phase noise estimation starting from the previous phase noise estimate, represented as a unit vector in the real-imaginary plane, which has an associated angle $\phi$ to it.

FIG. 6a illustrates a procedure for obtaining a raw phase noise estimate ($\tilde{\Delta}_\phi[k]=\exp(j \cdot \tilde{\phi}[k])$) at time instant k based on the previous phase noise estimate 611 ($\Delta_\phi[k-1]$), received sub-symbol 612 (r[k]), and the reference point 614-1 ($\hat{s}_i[k]$) that is closest to the corrected sub-symbol 613 ($\tilde{r}[k]$). Based on a first phase noise estimation from received pilot sub-symbols, for example PTRS in 5G NR, the next received sample is corrected with the first phase noise estimate, and a raw phase noise estimate comparing the corrected sub-symbol to a set of reference points 614-1, 614-2, 614-3, 614-4 is computed. The set of reference points may be based on data constellation symbols, for example from the QAM constellation that modulates the data bits, or a set of complex points evenly distributed over the unit circle, or other. For example, since the algorithm is focused on the phase value of the phase noise estimation, the reference points may be a set of complex values that correspond to the projection of the constellation symbols into the unit circle. In other words, the phases of the constellation symbols may be used as reference points. This may reduce the complexity, since for example for 16 QAM there are 16 different symbols, but just 12 different phases, thus reducing the set of reference points from 16 to 12 and decreasing the needed comparisons to perform the estimation. In other words, the number of reference points to compare may influence the complexity of the algorithm. The algorithm then selects the closest reference point 614-1 based on a distance metric, for example based on Euclidean distance or angular distance. The estimated phase error is the angle 615 ($\hat{\phi}[k]$, expressed in degrees or radians) between the selected reference point 614-1 and the received symbol 612.

FIG. 6b illustrates a procedure for obtaining an updated, or filtered, phase noise estimate 620 ($\Delta_\phi[k]$) based on the previous phase noise estimate ($\Delta_\phi[k-1]$), raw phase noise estimate ($\tilde{\Delta}_\phi[k]=\exp(j\cdot\hat{\phi}[k])$), and phase noise estimation step parameter ($\lambda$). After the raw phase noise estimate ($\tilde{\Delta}_\phi[k]$) is obtained, the kth sample of the phase noise estimates for the kth sub-symbol is calculated following a recursive estimate, which may depend on the previous phase noise estimate ($\Delta_\phi[k-1]$), the raw phase noise estimate ($\tilde{\Delta}_\phi[k]$) for the kth sub-symbol (sample), and the phase noise estimation step parameter $\lambda$. It should be noted that finite impulse response, FIR, or IIR filters and longer memories, or more past samples, may also be used.

Windowed overlap-and-add, WOLA, is a technique that may be used in a transmission to improve the spectral containment of the signal. This technique is based on a combination of samples between the beginning and the end of the DFT-s-OFDM symbol. Therefore, by applying WOLA, there may be a correlation between the sub-symbols at the beginning and at the end of the DFT-s-OFDM symbol. When WOLA is used at least in the receiver, it may generate this correlation, and the effective phase noise that affects the sub-symbols in the DFT-s-OFDM symbol may present a circular property. This means that if, for example, the phase noise is being estimated in the forward direction from the last pilot group, the estimation can continue from the same value on the first sub-symbols of the DFT-s-OFDM symbol. Similarly, if the phase noise is being tracked backwards from the first pilot group, it can continue from the last sub-symbols from the same value.

Figure 7:
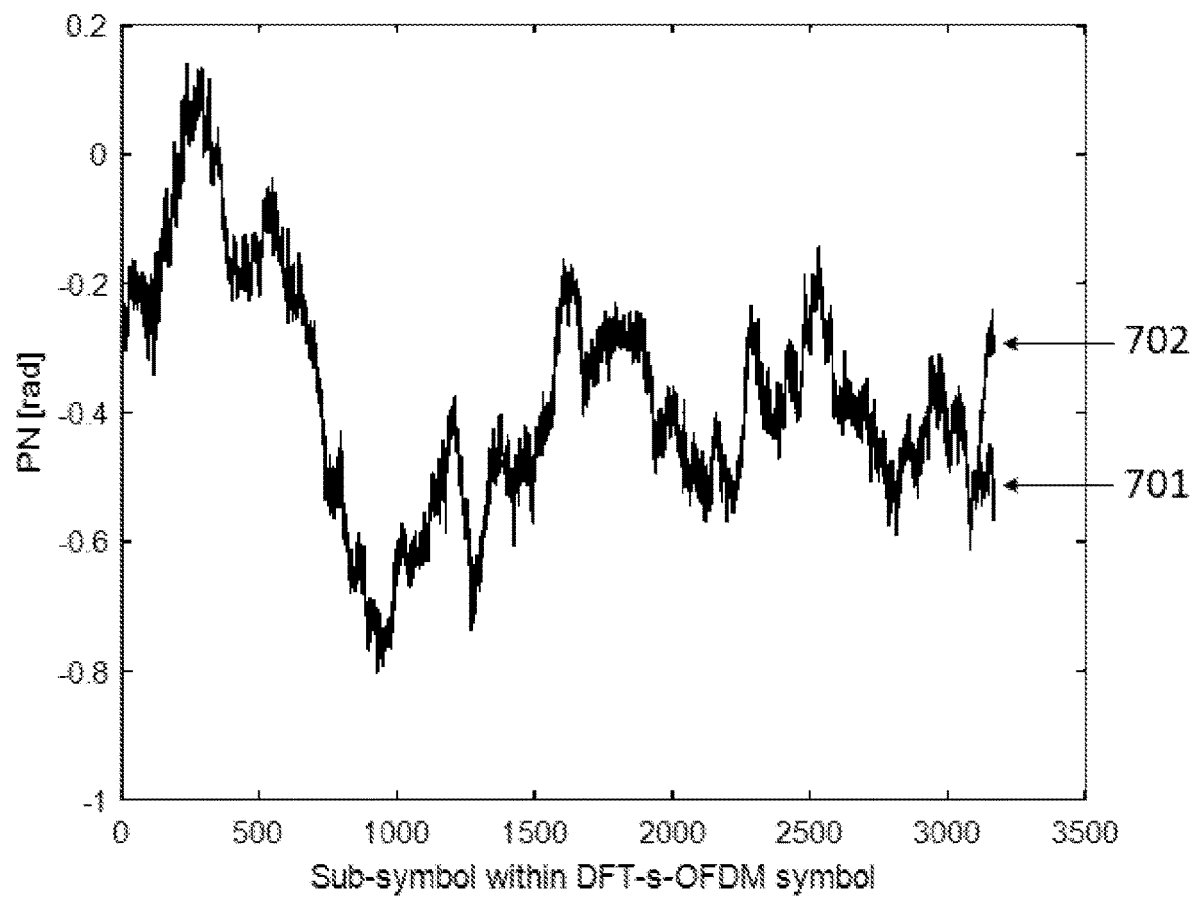
FIG. 7 illustrates an example comparing effective phase noise with and without windowed overlap-and-add processing.

FIG. 7 illustrates an example comparing the effective phase noise (denoted as PN) in a DFT-s-OFDM symbol, when WOLA is applied in the receiver and when WOLA is not applied. The curve 702 represents the effective phase noise when WOLA is applied in the receiver, and the curve 701 represents the effective phase noise when WOLA is not used. The effective phase noise affecting the last sub-symbols when no WOLA is used does not present circularity. However, the effective phase noise affecting the last sub-symbols, when WOLA is applied, has a circular property. In FIG. 7, it can be seen that the curve 702 at the end of the DFT-s-OFDM symbol continues with the same value/trend at the beginning of the DFT-s-OFDM symbol. This may be beneficial information for example for base station and UE implementations, where WOLA processing in the receiver is applied.

Some exemplary embodiments may provide a solution to circularly track the phase noise, when WOLA processing is used in the receiver side. In other words, some exemplary embodiments may provide a possibility to keep estimating recursively the phase noise from the last sub-symbol (r[M−1]) to the first sub-symbol (r[0]) and vice versa.

The phase noise estimation procedures of an exemplary embodiment with receiver WOLA processing are defined in the pseudo-code algorithm below. In this exemplary embodiment, r[k], k=0, . . . , M−1 are the M received samples (sub-symbols) in the block to be processed, for example the received sub-symbols of a DFT-s-OFDM symbol, and there are N groups of pilots, each group of pilots comprising P pilot sub-symbols. The rest of the received samples correspond to data sub-symbols.

```
01:   for p = 1 to N do
02:       Δ_φ^P = Average phase difference between received samples and pilot sub-symbols in group p
03:       if Forward estimation then
04:           for k from next sample of pilot group p, to previous sample of pilot group p (circularly) do
05:               r̃[k] = r[k] · conj(Δ_φ^P[k − 1])

06:               ŝ_i[k] = min_i d(r̃[k], s_i), i ∈ 0, 1, ... , K // K is the number of elements in the reference set 07:               Δ̂_φ^P[k] = exp[j∠(r[k] · conj(ŝ_i[k])]  // Raw phase noise estimate for sample k
08:               Δ_φ,F^P[k] = (1 − λ) · Δ_φ,F^P= [k − 1] + λ · Δ̂_φ^P[k]  // Forward phase noise estimate for sample k
09:           end for
10:       end if
11:       if Backward estimation then
12:           for k from previous sample of pilot group p, to next sample of pilot group p (circularly) in reverse order do
13:               r̃[k] = r[k] · conj(Δ_φ^P[k + 1])

14:               ŝ_i[k] = min_i d(r̃[k], s_i), i ∈ 0, 1, ... , K // K is the number of elements in the reference set 15:               Δ̂_φ^P[k] = exp[j∠(r[k] · conj(ŝ_i[k])]  // Raw phase noise estimate for sample k
16:               Δ_φ,B^P[k] = (1 − λ) · Δ_φ,B^P[k + 1] + λ · Δ̂_φ^P[k]  // Forward phase noise estimate for sample k
17:           end for
18:       end if
19:   end for
20:   Δ_φ = combination between Δ_φ,F^P and Δ_φ,B^P, for all p ∈ 1, 2, . . . , N following a defined way
21:   for k ∈ data sub-symbol indexes do
22:       r_corrected[k] = r[k] · conj(Δ_φ[k])
23:   end for
24:   return r_corrected
``` where $s_i$, $i \in \{0, 1, \ldots, K-1\}$ corresponds to the ith symbol of the K symbols reference set, $\hat{s}_i$ is the closest reference point (for example hard decision), $\hat{\Delta}_\phi^P[k]$ is the raw phase noise estimate for sample k having started the estimation in pilot group p, and $\Delta_\phi$ is the array comprising the phase noise estimates for the processed block. With this estimate, the data sub-symbols may be corrected by sample-wise multiplication by the conjugate of the phase noise estimate, providing in the output the phase noise compensated DFT-s-OFDM sub-symbols $r_{corrected}$.

In DFT-s-OFDM receiver processing, all the sub-symbols may be available in the receiver, and therefore the processing for estimating the phase noise can be parallelized. In that case, different processes may be executed in parallel, such as the phase estimations starting from the different pilot sub-symbol or group of pilot sub-symbol, thus reducing the latency of the algorithm. For instance, the for-loop of the first line in the pseudo code of the algorithm can be parallelized for all the different pilot sub-symbols or groups of pilot sub-symbols in the block to be processed, and the forward and backward estimations can be run in parallel as well, even if they start from the same pilot sub-symbol or group of pilot sub-symbols.

Different modifications to the algorithm may also be made. For example, at lines 6 and 14 of the algorithm, a likelihood value may be calculated based on the distance between the corrected sample ($\tilde{r}[k]$) and the selected reference point to update the value of the phase noise estimation step ($\lambda$). Also, this distance value may be used in line 20 of the algorithm to weight the combination of phase noise estimates.

In the case when both forward and backward phase noise estimation is performed over a common set of data sub-symbols, a combination between $\Delta_{\phi,F}^P$ and $\Delta_{\phi,B}^P$ can be done. If, for some data sub-symbols, only $\Delta_{\phi,F}^P$ or $\Delta_{\phi,B}^P$ is estimated, then only that estimate may be used. If some data sub-symbols have multiple estimates of $\Delta_{\phi,F}^P$ or $\Delta_{\phi,B}^P$, then all of these may be combined to obtain an improved phase noise estimate $\Delta_\phi$.

Figure 8:
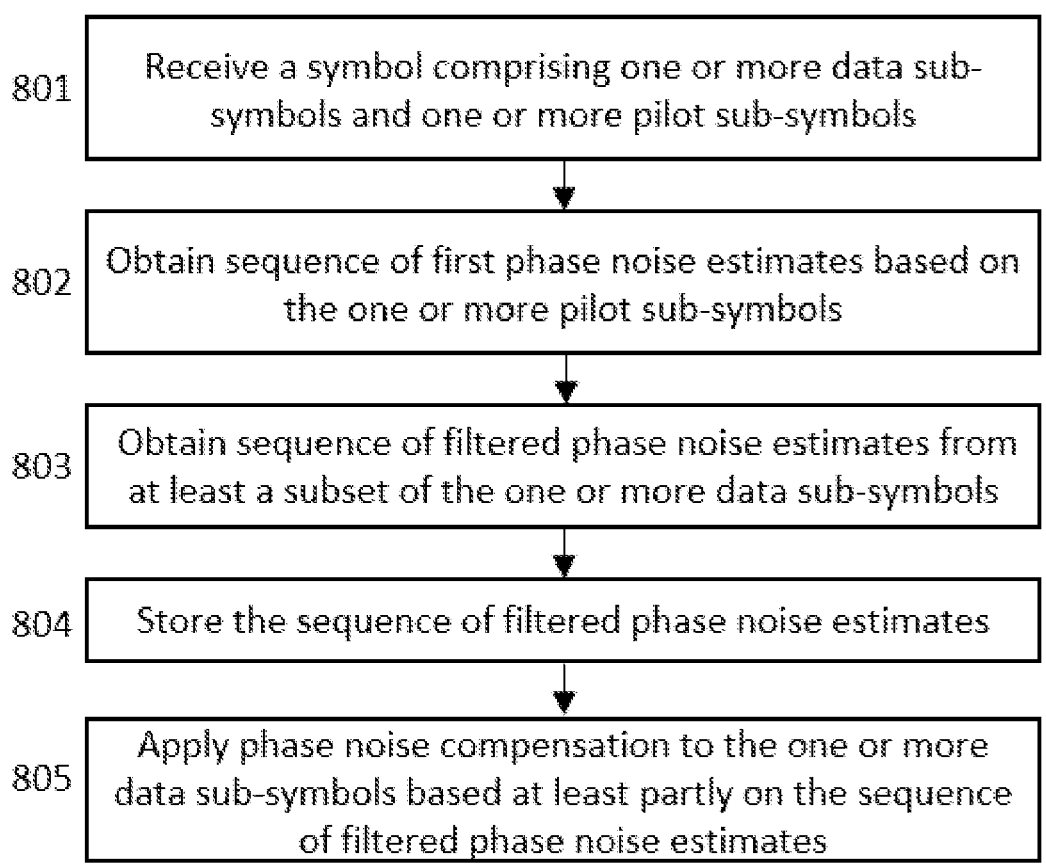
FIGS. 8 and 9 illustrate flow charts according to some exemplary embodiments.

FIG. 8 illustrates a flow chart according to an exemplary embodiment. A signal comprising at least one DFT-s-OFDM symbol is received 801, wherein the at least one DFT-s-OFDM symbol comprises one or more data sub-symbols and one or more pilot sub-symbols. A sequence of first phase noise estimates is obtained 802 based at least partly on the one or more pilot sub-symbols. A first filter is used to recursively obtain 803 a first sequence of filtered phase noise estimates from at least a subset of the one or more data sub-symbols based at least partly on the sequence of first phase noise estimates. For example, the first sequence of filtered phase noise estimates may be obtained sub-symbol by sub-symbol for each data sub-symbol comprised in the one or more data sub-symbols, or for every second or third data sub-symbol comprised in the one or more data sub-symbols, in which case the phase noise estimate for the skipped sub-symbols between the every second or third data sub-symbol may be interpolated. As an example, the first filter may be an IIR filter, such as a first-order IIR filter. The first sequence of filtered phase noise estimates is stored 804. Phase noise compensation is applied 805 to the one or more data sub-symbols based at least partly on the first sequence of filtered phase noise estimates.

If there are more than one data sub-symbols, then the first sequence of filtered phase noise estimates comprises plurality of phase noise estimate values, wherein each value is associated with a specific data sub-symbol. For example, the first value in the sequence may be associated with a first data sub-symbol, the second value in the sequence may be associated with a second data sub-symbol, and so on.

The functions and/or blocks described above by means of FIG. 8 are in no absolute chronological order, and some of them may be performed simultaneously or in an order differing from the described one. Other functions and/or blocks may also be executed between them or within them.

Figure 9:
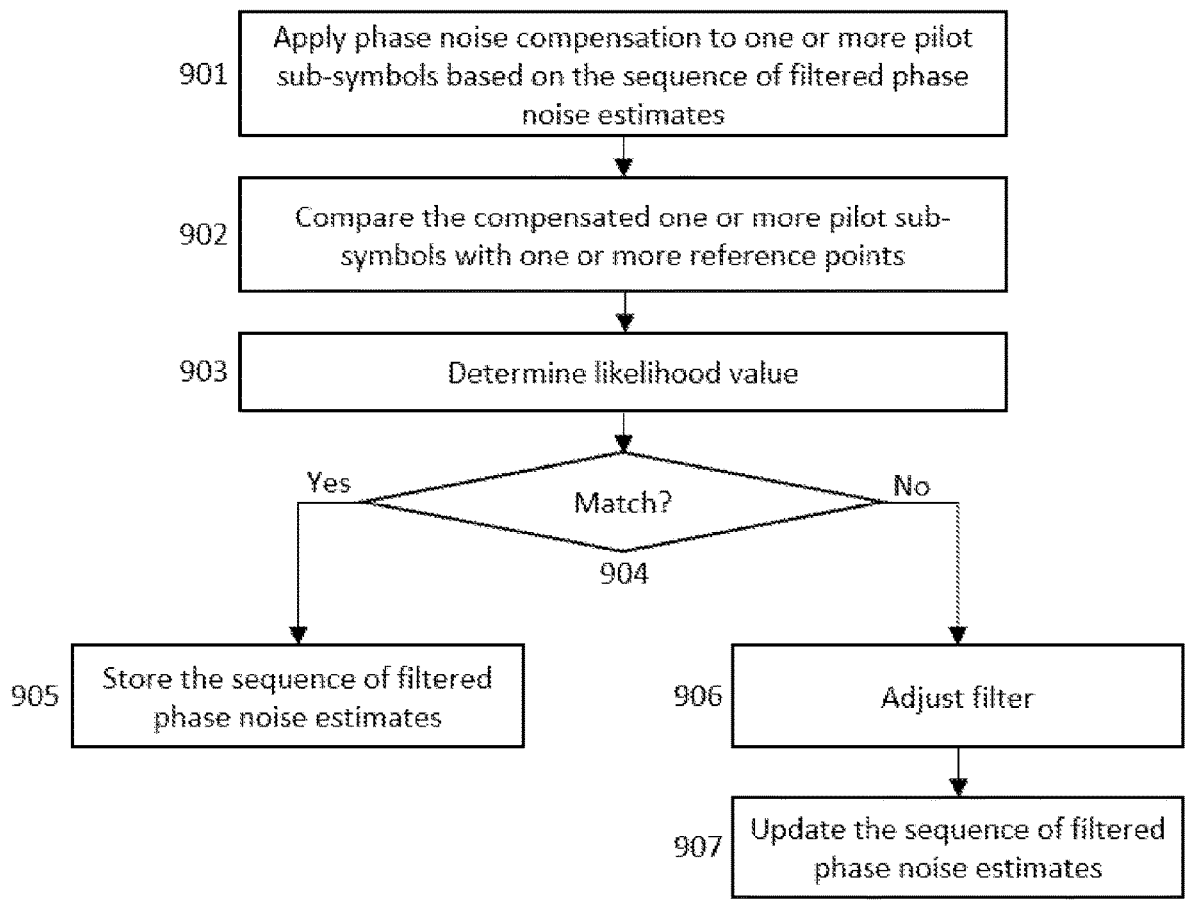

FIG. 9 illustrates a flow chart according to an exemplary embodiment. FIG. 9 illustrates functions that may be performed during a convergence check 504, 508 of FIG. 5. In the convergence check, phase noise compensation is applied 901 to one or more pilot sub-symbols based at least partly on a sequence of filtered phase noise estimates (i.e. the first sequence of filtered phase noise estimates or the second sequence of filtered phase noise estimates). The compensated one or more pilot sub-symbols are then compared 902 with one or more reference points. Optionally, a likelihood value may be determined 903 based at least partly on a distance between the compensated one or more pilot sub-symbols and the one or more reference points.

If the compensated one or more pilot sub-symbols substantially match with the one or more reference points (904: yes), then the sequence of filtered phase noise estimates is stored 905 in a buffer or some other internal or external memory.

If the compensated one or more pilot sub-symbols do not substantially match with the one or more reference points (904: no), then the corresponding filter (i.e. the first filter or the second filter) is adjusted 906 for example based at least partly on the likelihood value, and the sequence of filtered phase noise estimates is updated 907 with the adjusted filter. The process may be iterative such that it returns to block 901 after block 907 and continues from there.

The functions and/or blocks described above by means of FIG. 9 are in no absolute chronological order, and some of them may be performed simultaneously or in an order differing from the described one. Other functions and/or blocks may also be executed between them or within them.

Figure 10A:
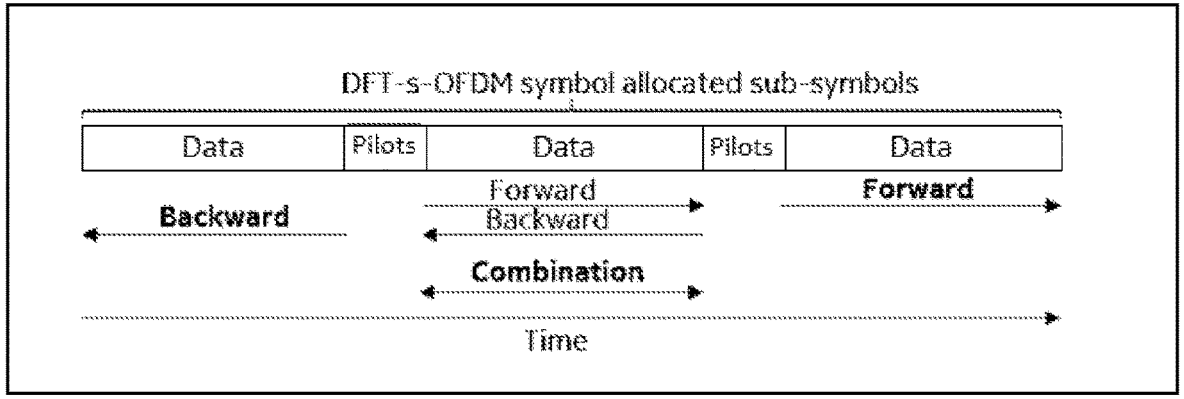
FIGS. 10a, 10b and 10c illustrate the time domain structure of a symbol and ways to estimate phase noise according to some exemplary embodiments.
Figure 10B:
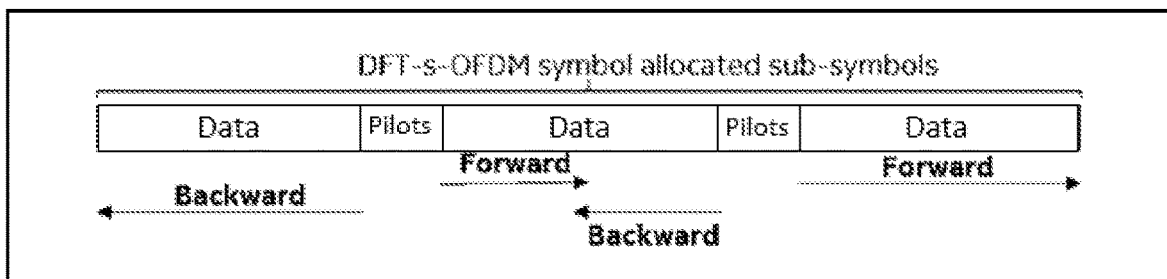
Figure 10C:
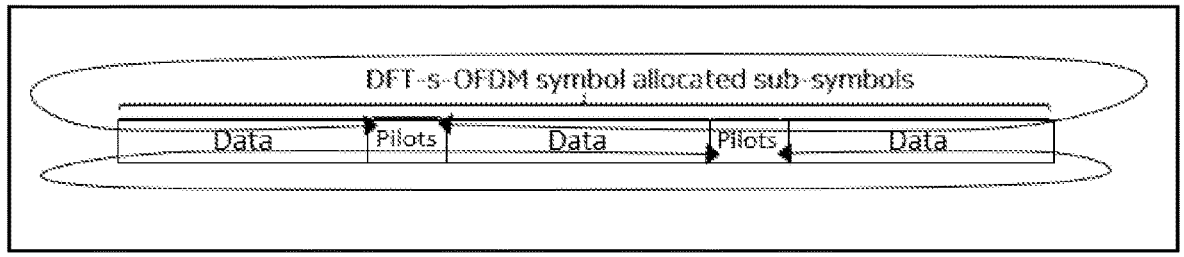

FIGS. 10a, 10b and 10c illustrate the time domain structure 1010, 1020, 1030 of a DFT-s-OFDM symbol with pilot sub-symbols to track the phase noise, and possible ways to estimate the phase noise according to some exemplary embodiments.

FIG. 10a illustrates an exemplary embodiment, wherein the forward and backward phase noise estimates are combined.

FIG. 10b illustrates an exemplary embodiment, wherein no combination of forward and backward estimates is made. In this exemplary embodiment, the phase noise estimate that is closer to the pilot sub-symbol, or pilot sub-symbol group, from which the estimation process started, may be used for compensating the phase noise.

FIG. 10c illustrates an exemplary embodiment with a WOLA receiver, wherein fully circular forward and backward phase noise estimates from each pilot sub-symbol group, for example PTRS group, may be computed and combined for compensating each data sub-symbol. After the phase noise estimation is obtained for all the time instants, in which the signal carries data symbols, the compensation may be done for example by multiplying the received samples with the conjugate of the combined phase noise estimate.

A technical advantage provided by some exemplary embodiments is that they may improve link performance, reduce block error rate, and reduce phase noise error by compensating the phase noise based on a more accurate phase noise estimate. Some exemplary embodiments may also enable use of higher order modulations. Furthermore, multiple instances of the phase noise tracking algorithm of some exemplary embodiments may be executed in parallel in order to reduce latency.

Figure 11:
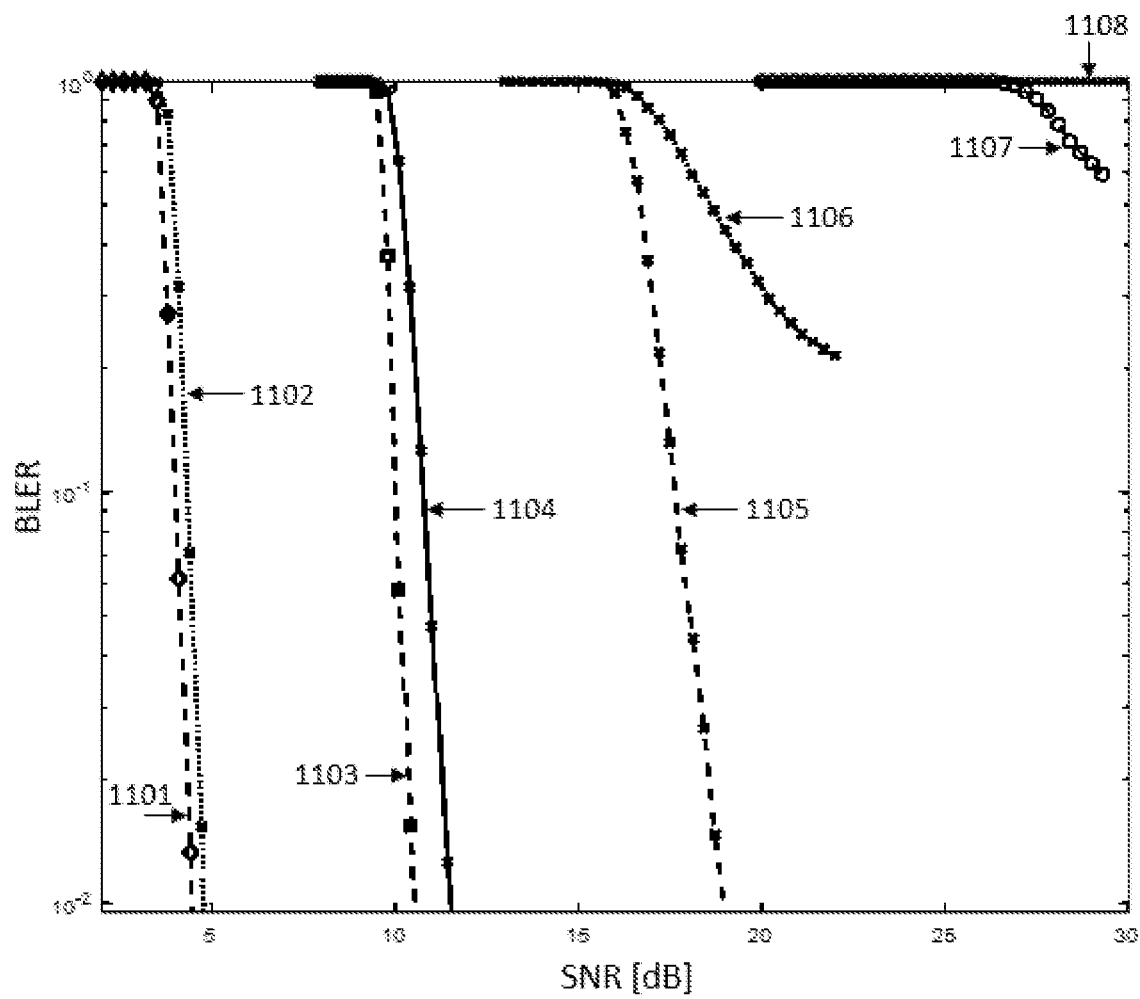
FIGS. 11 and 12 illustrate simulated measurement results.

FIG. 11 illustrates simulated measurement results. FIG. 11 illustrates BLER curves for various modulations under an AWGN channel with a carrier frequency of 90 GHz, a code rate of R=⅔, and 120 kHz SCS. The simulated scenarios use a PTRS configuration with 8 PTRS groups and 4 samples per group. In FIG. 11, the performance of the phase noise tracking algorithm of an exemplary embodiment is compared against the performance achieved with the best between linear interpolation or CPE compensation.

Referring to FIG. 11, the first curve 1101 illustrates the performance of the phase noise tracking algorithm for QPSK with λ=0.01. The second curve 1102 illustrates the performance of CPE compensation for QPSK. The third curve 1103 illustrates the performance of the phase noise tracking algorithm for 16 QAM with λ=0.02. The fourth curve 1104 illustrates the performance of linear interpolation for 16 QAM. The fifth curve 1105 illustrates the performance of the phase noise tracking algorithm for 64 QAM with λ=0.05. The sixth curve 1106 illustrates the performance of linear interpolation for 64 QAM. The seventh curve 1107 illustrates the performance of the phase noise tracking algorithm for 256 QAM with λ=0.1. The eighth curve 1108 illustrates the performance of linear interpolation for 256 QAM.

It can be seen from FIG. 11 that the phase noise tracking algorithm provides improved link performance in comparison to CPE compensation and linear interpolation. The phase noise tracking algorithm enables the use of 64 QAM with 120 kHz SCS. For QPSK and 16 QAM it improves the performance.

Figure 12:
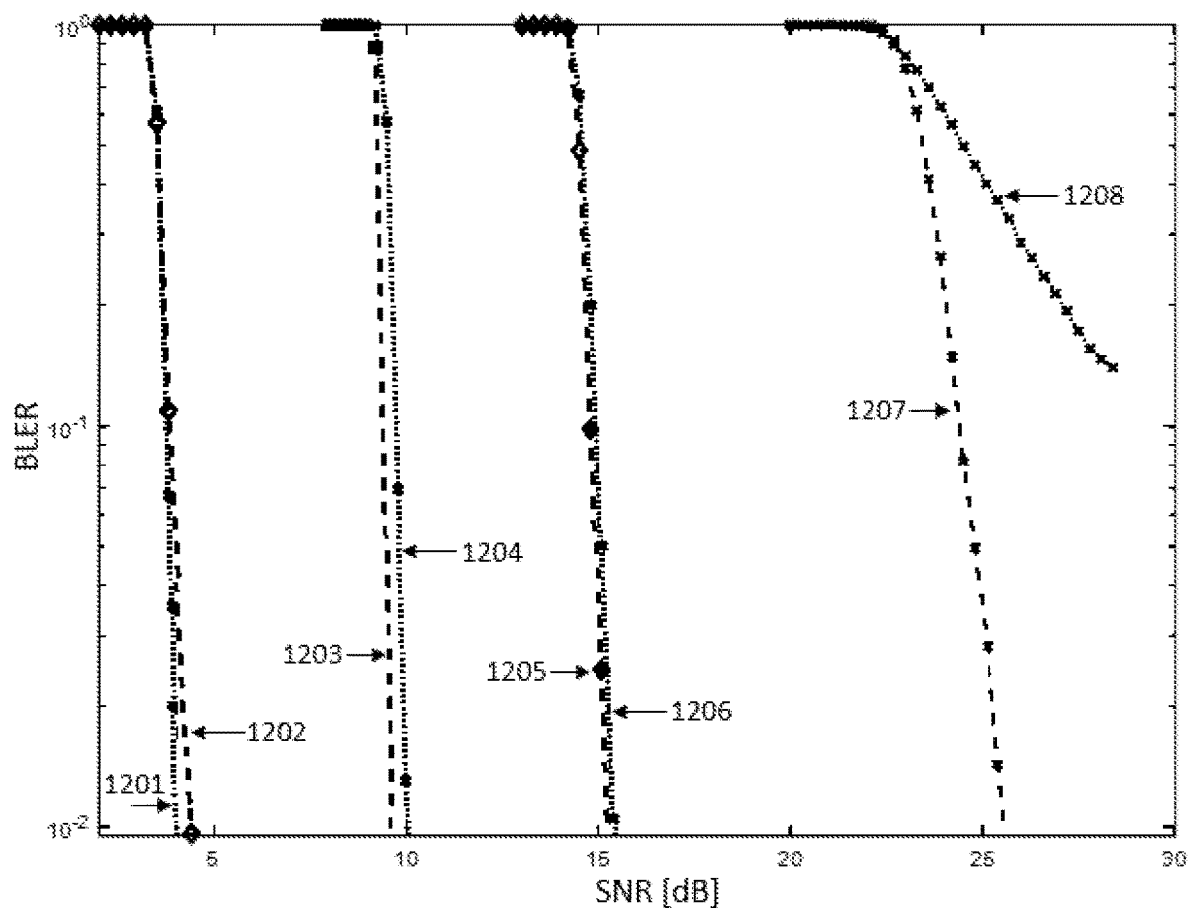

FIG. 12 illustrates simulated measurement results. FIG. 12 illustrates BLER curves for various modulations with otherwise the same parameters as in FIG. 11, but with 960 kHz SCS. In FIG. 12, the performance of the phase noise tracking algorithm of an exemplary embodiment is compared against the performance achieved with the best between linear interpolation or CPE compensation.

Referring to FIG. 12, the first curve 1201 illustrates the performance of the phase noise tracking algorithm for QPSK with λ=0.01. The second curve 1202 illustrates the performance of CPE compensation for QPSK. The third curve 1203 illustrates the performance of the phase noise tracking algorithm for 16 QAM with λ=0.02. The fourth curve 1204 illustrates the performance of linear interpolation for 16 QAM. The fifth curve 1205 illustrates the performance of the phase noise tracking algorithm for 64 QAM with λ=0.01. The sixth curve 1206 illustrates the performance of linear interpolation for 64 QAM. The seventh curve 1207 illustrates the performance of the phase noise tracking algorithm for 256 QAM with λ=0.05. The eighth curve 1208 illustrates the performance of linear interpolation for 256 QAM.

It can be seen from FIG. 12 that the phase noise tracking algorithm again provides improved performance. The phase noise tracking algorithm enables the use of 256 QAM to work under high phase noise conditions with an SCS of 960 kHz.

Some exemplary embodiments may also reduce complexity with a modified reference point set. In this case, the reference points are not directly the constellation symbols, but the projection of the different phases into the unit circle. By doing this, the number of comparisons may be reduced. This provides complexity reduction possibly with a small performance loss. To obtain the raw phase noise estimate, a hard decision may be made, which means that a comparison with all the reference points may be done for all the received data samples. Since mainly just the phase difference between the received sample and the symbol decided at the hard decision step is needed for the algorithm, the number of comparisons may be reduced by reducing the number of reference points in the set of reference points. For example, in 16 QAM modulation, there are 16 symbols, but some of them share the same phase value, giving 12 different phase values. Furthermore, if the comparisons are always done over one quarter of the IQ plan, with the corresponding mapping from the remaining 3 quarters, the number of reference points may be reduced by 4, resulting in just 3 reference points for 16 QAM. Table 2 below summarizes the reduction of reference points for different modulations.

TABLE 2

| Modulation | Number of symbols | Number of different phases | Number of reference points after projection into one quarter | Reduction in number of comparisons per received sample |
|---|---|---|---|---|
| QPSK | 4 | 4 | 1 | 75% |
| 16QAM | 16 | 12 | 3 | 81.25% |
| 64QAM | 64 | 52 | 13 | 79.69% |
| 256QAM | 256 | 196 | 49 | 80.86% |

Some exemplary embodiments may be applied to an apparatus such as a base station or a terminal device, or to a receiver comprised in a base station or a terminal device.

Figure 13:
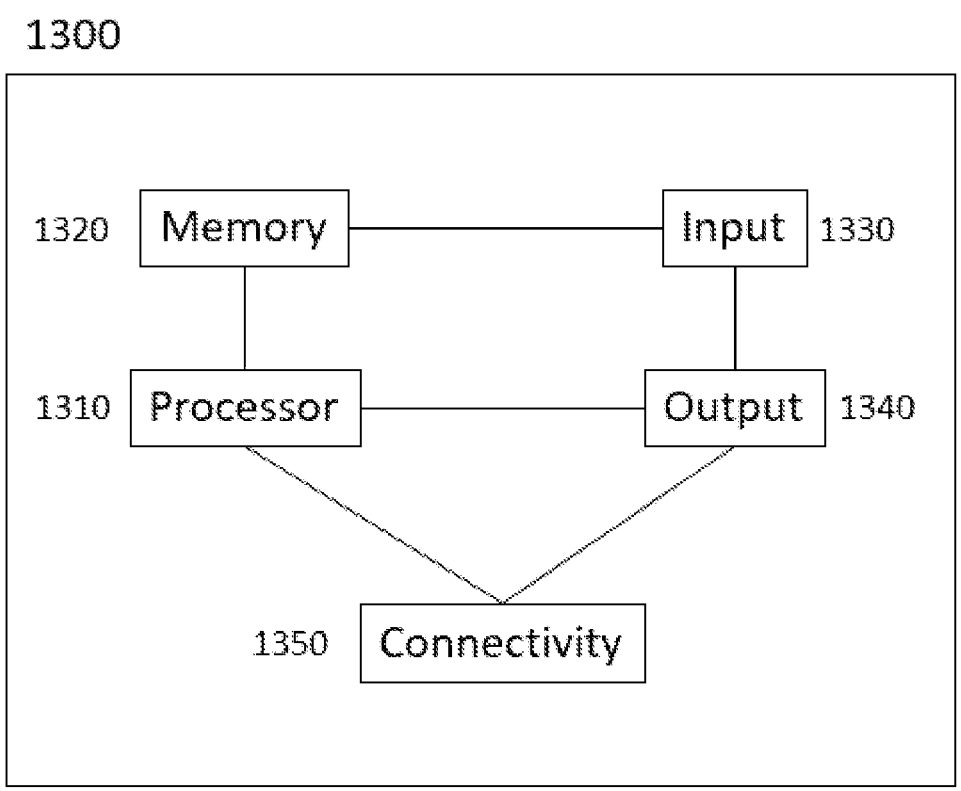
FIGS. 13 and 14 illustrate apparatuses according to some exemplary embodiments.

FIG. 13 illustrates an apparatus 1300, which may be an apparatus such as, or comprised in, a terminal device, according to an exemplary embodiment. A terminal device may also be referred to as a UE herein. The apparatus 1300 comprises a processor 1310. The processor 1310 interprets computer program instructions and processes data. The processor 1310 may comprise one or more programmable processors. The processor 1310 may comprise programmable hardware with embedded firmware and may, alternatively or additionally, comprise one or more application specific integrated circuits, ASICs.

The processor 1310 is coupled to a memory 1320. The processor is configured to read and write data to and from the memory 1320. The memory 1320 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 1320 stores computer readable instructions that are executed by the processor 1310. For example, non-volatile memory stores the computer readable instructions and the processor 1310 executes the instructions using volatile memory for temporary storage of data and/or instructions.

The computer readable instructions may have been pre-stored to the memory 1320 or, alternatively or additionally, they may be received, by the apparatus, via an electromagnetic carrier signal and/or may be copied from a physical entity such as a computer program product. Execution of the computer readable instructions causes the apparatus 1300 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 1300 may further comprise, or be connected to, an input unit 1330. The input unit 1330 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 1330 may comprise an interface to which external devices may connect to.

The apparatus 1300 may also comprise an output unit 1340. The output unit may comprise or be connected to one or more displays capable of rendering visual content such as a light emitting diode, LED, display, a liquid crystal display, LCD and a liquid crystal on silicon, LCOS, display. The output unit 1340 may further comprise one or more audio outputs. The one or more audio outputs may be for example loudspeakers.

The apparatus 1300 further comprises a connectivity unit 1350. The connectivity unit 1350 enables wireless connectivity to one or more external devices. The connectivity unit 1350 comprises at least one transmitter and at least one receiver that may be integrated to the apparatus 1300 or that the apparatus 1300 may be connected to. The at least one transmitter comprises at least one transmission antenna, and the at least one receiver comprises at least one receiving antenna. The connectivity unit 1350 may comprise an integrated circuit or a set of integrated circuits that provide the wireless communication capability for the apparatus 1300. Alternatively, the wireless connectivity may be a hardwired application specific integrated circuit, ASIC. The connectivity unit 1350 may comprise one or more components such as a power amplifier, digital front end, DFE, analog-to-digital converter, ADC, digital-to-analog converter, DAC, frequency converter, (de)modulator, and/or encoder/decoder circuitries, controlled by the corresponding controlling units.

It is to be noted that the apparatus 1300 may further comprise various components not illustrated in FIG. 13. The various components may be hardware components and/or software components.

Figure 14:
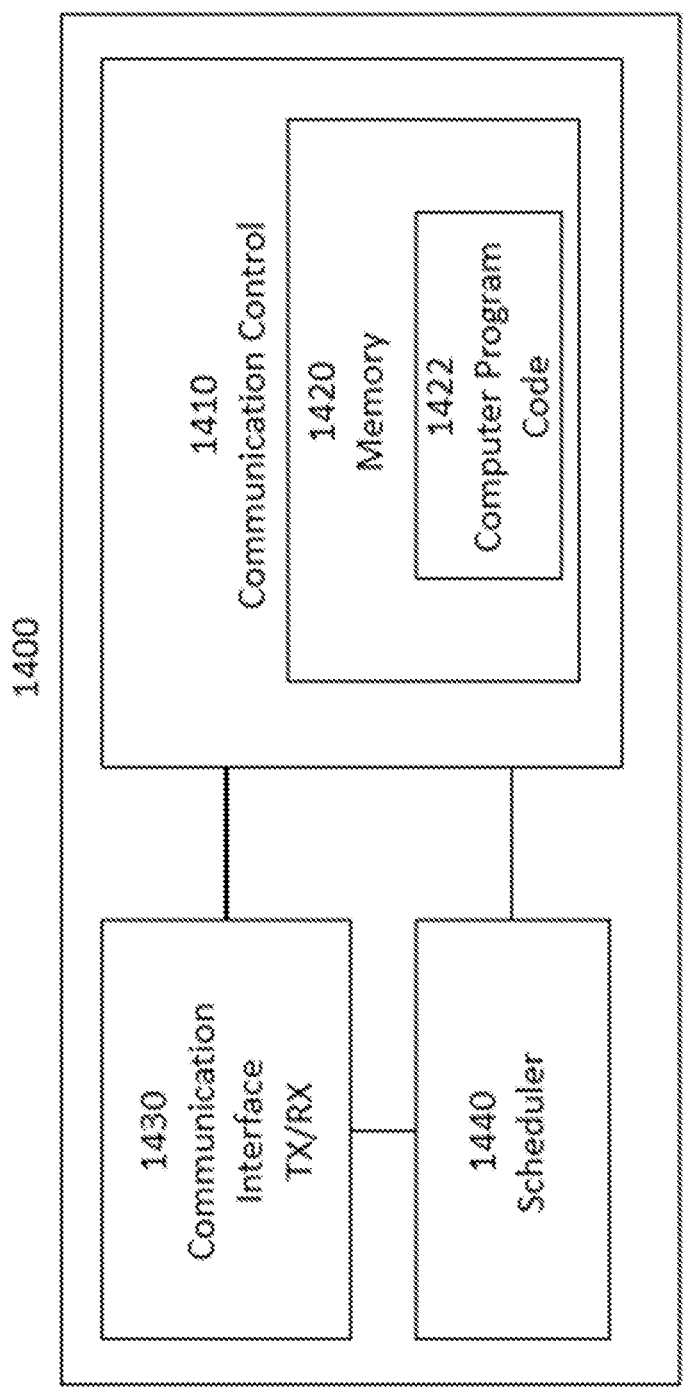

The apparatus 1400 of FIG. 14 illustrates an exemplary embodiment of an apparatus such as, or comprised in, a base station such as a gNB. The apparatus may comprise, for example, a circuitry or a chipset applicable to a base station to realize some of the described exemplary embodiments. The apparatus 1400 may be an electronic device comprising one or more electronic circuitries. The apparatus 1400 may comprise a communication control circuitry 1410 such as at least one processor, and at least one memory 1420 including a computer program code (software) 1422 wherein the at least one memory and the computer program code (software) 1422 are configured, with the at least one processor, to cause the apparatus 1400 to carry out some of the exemplary embodiments described above.

The memory 1420 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some exemplary embodiments, structures of the frames used in the detected neighbour cells.

The apparatus 1400 may further comprise a communication interface 1430 comprising hardware and/or software for realizing communication connectivity according to one or more communication protocols. The communication interface 1430 may provide the apparatus with radio communication capabilities to communicate in the cellular communication system. The communication interface may, for example, provide a radio interface to terminal devices. The apparatus 1400 may further comprise another interface towards a core network such as the network coordinator apparatus and/or to the access nodes of the cellular communication system. The apparatus 1400 may further comprise a scheduler 1440 that is configured to allocate resources.

As used in this application, the term "circuitry" may refer to one or more or all of the following:
  a. hardware-only circuit implementations (such as implementations in only analog and/or digital circuitry) and
  b. combinations of hardware circuits and software, such as (as applicable):
    i. a combination of analog and/or digital hardware circuit(s) with software/firmware and
    ii. any portions of hardware processor(s) with software (including digital signal processor(s)), software, and memory (ies) that work together to cause an apparatus, such as a mobile phone, to perform various functions) and
  c. hardware circuit(s) and or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus comprising at least one processor, and at least one memory storing instructions that, when executed by the at least one processor, cause the apparatus to:
   receive a symbol comprising one or more data sub-symbols and one or more pilot sub-symbols;
   obtain a sequence of first phase noise estimates based at least partly on the one or more pilot sub-symbols;
   use a first filter to obtain a first sequence of filtered phase noise estimates from at least a subset of the one or more data sub-symbols based at least partly on the sequence of first phase noise estimates;
   use a second filter to recursively obtain a second sequence of filtered phase noise estimates from at least the subset of the one or more data sub-symbols based at least partly on the sequence of first phase noise estimates;
   store the first sequence of filtered phase noise estimates and the second sequence of filtered phase noise estimates;
   combine the first sequence of filtered phase noise estimates and the second sequence of filtered phase noise estimates into a combined sequence of phase noise estimates; and
   apply phase noise compensation to the one or more data sub-symbols based at least partly on the combined sequence of phase noise estimates.

2. An apparatus according to claim 1, wherein the first filter comprises an infinite impulse response filter.

3. An apparatus according to claim 1, wherein the one or more data sub-symbols comprise a plurality of data sub-symbols, and the first sequence of filtered phase noise estimates is obtained circularly from a last data sub-symbol of the plurality of data sub-symbols to a first data sub-symbol of the plurality of data sub-symbols, or from the first data sub-symbol to the last data sub-symbol.

4. An apparatus according to claim 1,
   wherein the second sequence of filtered phase noise estimates is obtained in a reverse order compared to the first sequence of filtered phase noise estimates.

5. An apparatus according to claim 4, wherein the combined sequence of phase noise estimates is an average of the first sequence of filtered phase noise estimates and the second sequence of filtered phase noise estimates.

6. An apparatus according to claim 4, wherein the first filter and the second filter are used in parallel.

7. An apparatus according to claim 1, wherein the apparatus is further caused to:
   apply phase noise compensation to the one or more pilot sub-symbols based at least partly on the first sequence of filtered phase noise estimates;
   compare the compensated one or more pilot sub-symbols with one or more reference points; and
   adjust the first filter and update the first sequence of filtered phase noise estimates with the adjusted first filter, if the compensated one or more pilot sub-symbols do not substantially match with the one or more reference points;
   wherein the first sequence of filtered phase noise estimates is stored, if the compensated one or more pilot sub-symbols substantially match with the one or more reference points.

8. An apparatus according to claim 7, wherein the apparatus is further caused to:
   determine a likelihood value based at least partly on a distance between the compensated one or more pilot sub-symbols and the one or more reference points.

9. An apparatus according to claim 8, wherein the first filter is adjusted based at least partly on the likelihood value.

10. An apparatus according to claim 1, wherein the apparatus is comprised in a terminal device or in a base station.

11. A method comprising:
    receiving a symbol comprising one or more data sub-symbols and one or more pilot sub-symbols;
    obtaining a sequence of first phase noise estimates based at least partly on the one or more pilot sub-symbols;
    using a first filter to obtain a first sequence of filtered phase noise estimates from at least a subset of the one or more data sub-symbols based at least partly on the sequence of first phase noise estimates;
    using a second filter to recursively obtain a second sequence of filtered phase noise estimates from at least the subset of the one or more data sub-symbols based at least partly on the sequence of first phase noise estimates;
    storing the first sequence of filtered phase noise estimates and the second sequence of filtered phase noise estimates;
    combining the first sequence of filtered phase noise estimates and the second sequence of filtered phase noise estimates into a combined sequence of phase noise estimates; and
    applying phase noise compensation to the one or more data sub-symbols based at least partly on the combined sequence of phase noise estimates.

12. A method according to claim 11, wherein the first filter comprises an infinite impulse response filter.

13. A method according to claim 11, wherein the one or more data sub-symbols comprise a plurality of data sub-symbols, and the first sequence of filtered phase noise estimates is obtained circularly from a last data sub-symbol of the plurality of data sub-symbols to a first data sub-symbol of the plurality of data sub-symbols, or from the first data sub-symbol to the last data sub-symbol.

14. A method according to claim 11,
    wherein the second sequence of filtered phase noise estimates is obtained in a reverse order compared to the first sequence of filtered phase noise estimates.

15. A method according to claim 14, wherein the combined sequence of phase noise estimates is an average of the first sequence of filtered phase noise estimates and the second sequence of filtered phase noise estimates.

16. A method according to claim 14, wherein the first filter and the second filter are used in parallel.

17. A method according to claim 11, wherein the method further comprises:
    applying phase noise compensation to the one or more pilot sub-symbols based at least partly on the first sequence of filtered phase noise estimates;
    comparing the compensated one or more pilot sub-symbols with one or more reference points; and
    adjusting the first filter and updating the first sequence of filtered phase noise estimates with the adjusted first filter, if the compensated one or more pilot sub-symbols do not substantially match with the one or more reference points;

wherein the first sequence of filtered phase noise estimates is stored, if the compensated one or more pilot sub-symbols substantially match with the one or more reference points.

18. A method according to claim 17, wherein the method further comprises:

determining a likelihood value based at least partly on a distance between the compensated one or more pilot sub-symbols and the one or more reference points.

19. A method according to claim 11, wherein the method is used in a terminal device or in a base station.

20. A non-transitory computer readable medium comprising program instructions that, when executed by an apparatus, cause the apparatus to perform at least the following:

receive a symbol comprising one or more data sub-symbols and one or more pilot sub-symbols;

obtain a sequence of first phase noise estimates based at least partly on the one or more pilot sub-symbols;

use a first filter to obtain a first sequence of filtered phase noise estimates from at least a subset of the one or more data sub-symbols based at least partly on the sequence of first phase noise estimates;

use a second filter to recursively obtain a second sequence of filtered phase noise estimates from at least the subset of the one or more data sub-symbols based at least partly on the sequence of first phase noise estimates;

store the first sequence of filtered phase noise estimates and the second sequence of filtered phase noise estimates;

combine the first sequence of filtered phase noise estimates and the second sequence of filtered phase noise estimates into a combined sequence of phase noise estimates; and apply phase noise compensation to the one or more data sub-symbols based at least partly on the combined sequence of phase noise estimates.

\* \* \* \* \*